United States Patent
Kokubo et al.

(10) Patent No.: US 9,057,292 B2
(45) Date of Patent: Jun. 16, 2015

(54) VALVE TIMING ADJUSTMENT SYSTEM

(75) Inventors: Satoshi Kokubo, Nagoya (JP); Yuji Kakuda, Toyota (JP); Kenji Ikeda, Nagoya (JP); Yuuki Ohta, Okazaki (JP); Masaki Kobayashi, Okazaki (JP)

(73) Assignee: AISIN SEIKI KABUSHIKI KAISHA, Kariya-Shi, Aichi (JP)

( * ) Notice: Subject to any disclaimer, the term of this patent is extended or adjusted under 35 U.S.C. 154(b) by 0 days.

(21) Appl. No.: 14/131,189

(22) PCT Filed: Jul. 5, 2012

(86) PCT No.: PCT/JP2012/067175
§ 371 (c)(1),
(2), (4) Date: Apr. 11, 2014

(87) PCT Pub. No.: WO2013/008710
PCT Pub. Date: Jan. 17, 2013

(65) Prior Publication Data
US 2014/0216377 A1      Aug. 7, 2014

(30) Foreign Application Priority Data

Jul. 12, 2011   (JP) ................. 2011-154141
Jul. 12, 2011   (JP) ................. 2011-154143

(51) Int. Cl.
*F01L 1/34*     (2006.01)
*F01L 1/356*    (2006.01)
(Continued)

(52) U.S. Cl.
CPC ........... *F01L 1/356* (2013.01); *F02D 13/0219* (2013.01); *F01L 1/3442* (2013.01);
(Continued)

(58) Field of Classification Search
USPC ..................... 123/90.15, 90.17
See application file for complete search history.

(56) References Cited

U.S. PATENT DOCUMENTS 5,823,152 A   10/1998 Ushida
5,836,277 A   11/1998 Kira et al.
(Continued)

FOREIGN PATENT DOCUMENTS

JP   4-292506 A     10/1992
JP   11-132015 A    5/1999
(Continued)

OTHER PUBLICATIONS

English language translation of International Preliminary Report on Patentability (PCT/IB/373) issued by the International Bureau on Jan. 23, 2014 in International Application No. PCT/JP2012/067175.
(Continued)

*Primary Examiner* — Thomas Denion
*Assistant Examiner* — Daniel Bernstein
(74) *Attorney, Agent, or Firm* — Buchanan Ingersoll & Rooney PC

(57) ABSTRACT

Provided is a timing adjustment system having improved control for achieving a target rotational phase. The valve timing adjustment system includes a displacement mechanism unit that displaces a rotational phase of a camshaft relative to a crankshaft of an internal combustion engine; a locking mechanism unit that locks the rotational phase at an intermediate locked phase positioned within a displacement range of the rotational phase; a hydraulic pathway that hydraulically drives the displacement mechanism unit and the locking mechanism unit; and a control unit including a control system that controls operations of the hydraulic control valve. The control unit changes a temporal responsiveness of the control system based on a displacement force that displaces the rotational phase.

20 Claims, 21 Drawing Sheets

(51) Int. Cl.
*F02D 13/02* (2006.01)
*F01L 1/344* (2006.01)
*F01L 1/047* (2006.01)

(52) U.S. Cl.
CPC .................. *F01L2001/0476* (2013.01); *F01L 2001/34466* (2013.01); *F01L 2001/34469* (2013.01); *F01L 2001/34476* (2013.01); *F01L 2001/34483* (2013.01); *F01L 2250/02* (2013.01); *F01L 2800/00* (2013.01); *Y02T 10/18* (2013.01); *F01L 2001/3443* (2013.01); *F01L 2001/34423* (2013.01)
USPC ..................................................... 123/90.17

(56) References Cited

U.S. PATENT DOCUMENTS

| | | | |
|---|---|---|---|
| 6,053,139 | A | 4/2000 | Eguchi et al. |
| 6,505,586 | B1 | 1/2003 | Sato et al. |
| 6,574,544 | B1 | 6/2003 | Yoshizawa et al. |
| 6,739,298 | B2 | 5/2004 | Kusano et al. |
| 7,497,193 | B2 | 3/2009 | Knecht et al. |
| 8,360,022 | B2 * | 1/2013 | Ozawa et al. ............. 123/90.17 |
| 2002/0139331 | A1 | 10/2002 | Takahashi et al. |
| 2002/0139332 | A1 | 10/2002 | Takenaka |
| 2005/0257763 | A1 | 11/2005 | Watanabe et al. |
| 2006/0100802 | A1 | 5/2006 | Miyakoshi et al. |
| 2007/0144475 | A1 | 6/2007 | Suzuki et al. |
| 2010/0050966 | A1 | 3/2010 | Ozawa et al. |
| 2010/0175649 | A1 | 7/2010 | Suzuki et al. |
| 2010/0294223 | A1 | 11/2010 | Adachi et al. |
| 2011/0023804 | A1 | 2/2011 | Takemura |
| 2011/0061619 | A1 | 3/2011 | Urushihata |
| 2011/0085921 | A1 | 4/2011 | Kato et al. |
| 2011/0168114 | A1 | 7/2011 | Kobayashi et al. |
| 2012/0000437 | A1 * | 1/2012 | Ozawa et al. ............. 123/90.15 |
| 2013/0112161 | A1 * | 5/2013 | Fujiwaki et al. ........... 123/90.16 |
| 2014/0130755 | A1 * | 5/2014 | Kobayashi et al. ........ 123/90.17 |
| 2014/0150744 | A1 * | 6/2014 | Kakuda et al. ........... 123/90.17 |

FOREIGN PATENT DOCUMENTS

| | | | |
|---|---|---|---|
| JP | 11-210424 | A | 8/1999 |
| JP | 11-236831 | A | 8/1999 |
| JP | 11-311107 | A | 11/1999 |
| JP | 2000-002104 | A | 1/2000 |
| JP | 2000-204982 | A | 7/2000 |
| JP | 2001-055934 | A | 2/2001 |
| JP | 2002-285872 | A | 10/2002 |
| JP | 2002-357105 | A | 12/2002 |
| JP | 2003-206711 | A | 7/2003 |
| JP | 2003-286813 | A | 10/2003 |
| JP | 2005-330892 | A | 12/2005 |
| JP | 2006-132497 | A | 5/2006 |
| JP | 2006-220154 | A | 8/2006 |
| JP | 3918971 | B2 | 5/2007 |
| JP | 2007-198365 | A | 8/2007 |
| JP | 2008-180132 | A | 8/2008 |
| JP | 2009-047128 | A | 3/2009 |
| JP | 2009-074384 | A | 4/2009 |
| JP | 2009-174473 | A | 8/2009 |
| JP | 2009-203886 | A | 9/2009 |
| JP | 2009-243372 | A | 10/2009 |
| JP | 2010-065605 | A | 3/2010 |
| JP | 2010-138732 | A | 6/2010 |
| JP | 2010-275970 | A | 9/2010 |
| JP | 2010-270740 | A | 12/2010 |
| JP | 2010-285986 | A | 12/2010 |
| JP | 2011-032906 | A | 2/2011 |
| JP | 2011-032950 | A | 2/2011 |
| JP | 2011-058444 | A | 3/2011 |
| JP | 2011-069245 | A | 4/2011 |
| JP | 2011-080430 | A | 4/2011 |
| JP | 2011-094533 | A | 5/2011 |
| JP | 2011-111893 | A | 6/2011 |
| WO | WO 2011/001702 | A1 | 1/2011 |
| WO | WO 2012/008354 | A1 | 1/2012 |

OTHER PUBLICATIONS

Office Action issued on May 8, 2014, by the Japan Patent Office in corresponding Japanese Patent Application No. 2011-154141. (2 pages).

International Search Report (PCT/ISA/210) issued on Mar. 9, 2010, by Japanese Patent Office as the International Searching Authority for International Application No. PCT/JP2010/052075.

Written Opinion (PCT/ISA/237) issued on Mar. 9, 2010, by Japanese Patent Office as the International Searching Authority for International Application No. PCT/JP2010/052075.

Notification of Translation of the International Preliminary Report on Patentability (Forms PCT/IB/338 and PCT/IB/373) and the Written Opinion of the International Searching Authority (Form PCT/ISA/237) issued on Feb. 23, 2012, in the corresponding International Application No. PCT/JP2010/052075 (6 pages).

International Search Report (PCT/ISA/210) issued on Aug. 2, 2011, by the Japanese Patent Office as the International Searching Authority for International Application No. PCT/JP2011/065589.

Written Opinion (PCT/ISA/237) issued on Aug. 2, 2011, by the Japanese Patent Office as the International Searching Authority for International Application No. PCT/JP2011/065589.

International Preliminary Report on Patentability (PCT/IB/338) and English Translation of Written Opinion of the International Searching Authority (PCT/ISA/237( in the corresponding International Patent Application No. PCT/JP2011/065589.

International Search Report (PCT/ISA/210) mailed on Sep. 11, 2012, by the Japanese Patent Office as the International Searching Authority for International Application No. PCT/JP2012/065337.

Written Opinion (PCT/ISA/237) mailed on Sep. 11, 2012, by the Japanese Patent Office as the International Searching Authority for International Application No. PCT/JP2012/065337.

International Search Report (PCT/ISA/210) mailed on Aug. 7, 2012, by the Japanese Patent Office as the International Searching Authority for International Application No. PCT/JP2012/067176.

Written Opinion (PCT/ISA/237) mailed on Aug. 7, 2012, by the Japanese Patent Office as the International Searching Authority for International Application No. PCT/JP2012/067176.

International Search Report (PCT/ISA/210) mailed on Aug. 7, 2012, by the Japanese Patent Office as the International Searching Authority for International Application No. PCT/JP2012/067175.

Written Opinion (PCT/ISA/237) mailed on Aug. 7, 2012, by the Japanese Patent Office as the International Searching Authority for International Application No. PCT/JP2012/067175.

Japanese Office Action for Japanese Patent Application No. 2011-154143. English translation of relevant portion of Notice of Reasons for Rejection, dated Nov. 13, 2013.

Japanese Office Action issued on Nov. 13, 2014, by the Japan Patent Office, in corresponding Japanese Patent Application No. 2011-154141, and English language translation of relevant portion of Japanese Office Action. (4 pages).

European Search Report issued on Feb. 9, 2015, by the European Patent Office, in corresponding European Patent Application No. 12811571.4. (8 pages).

* cited by examiner

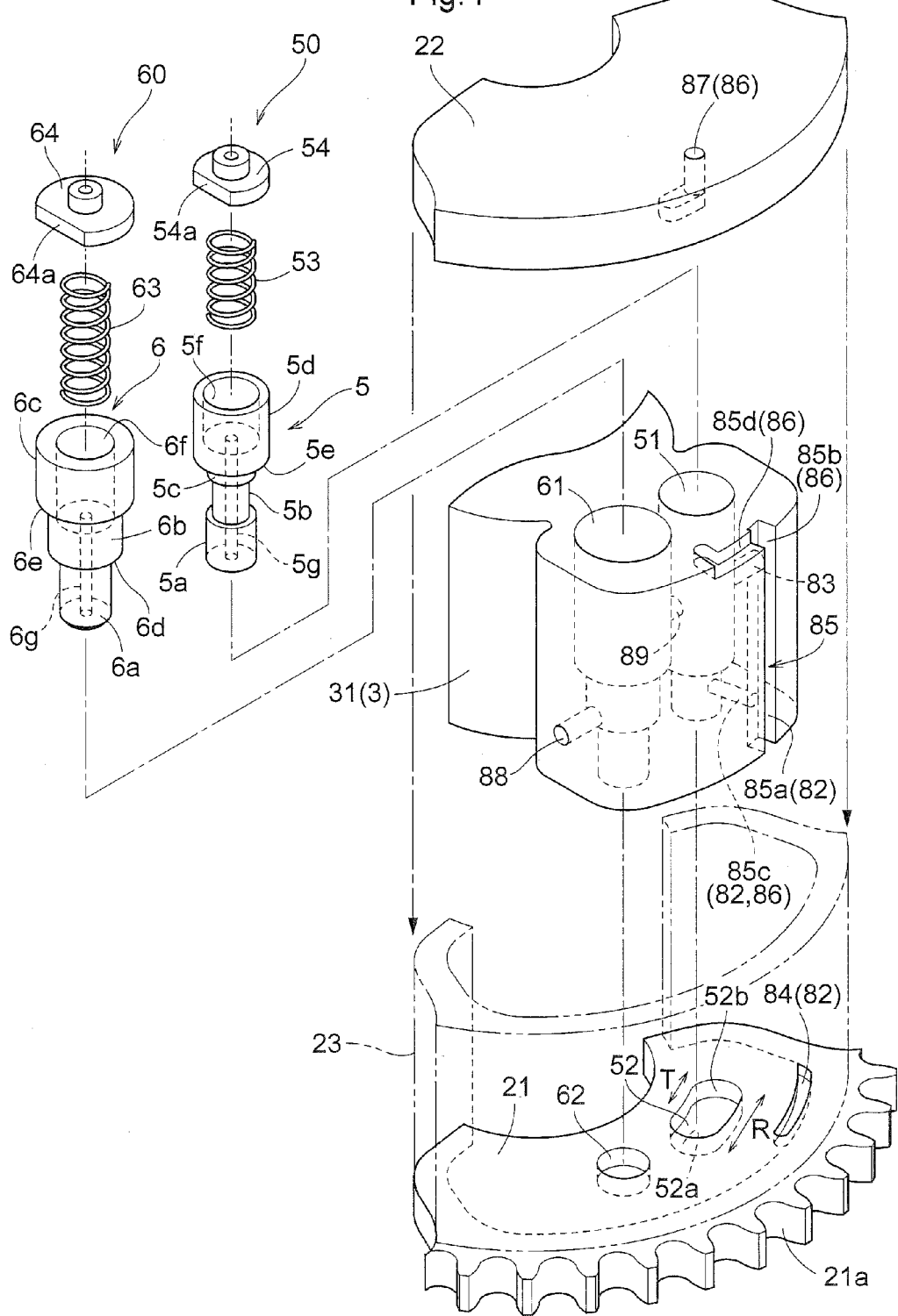

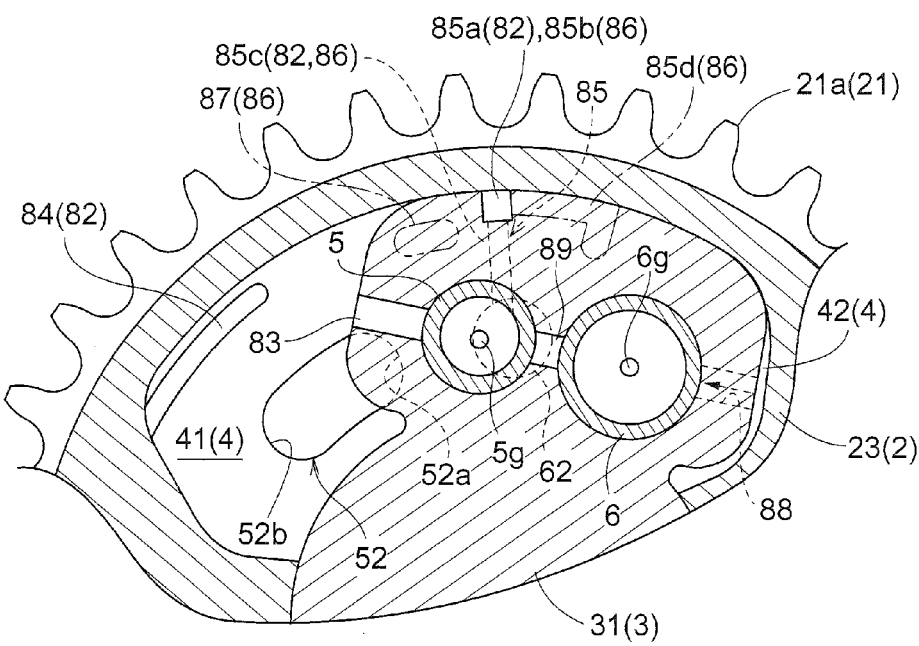
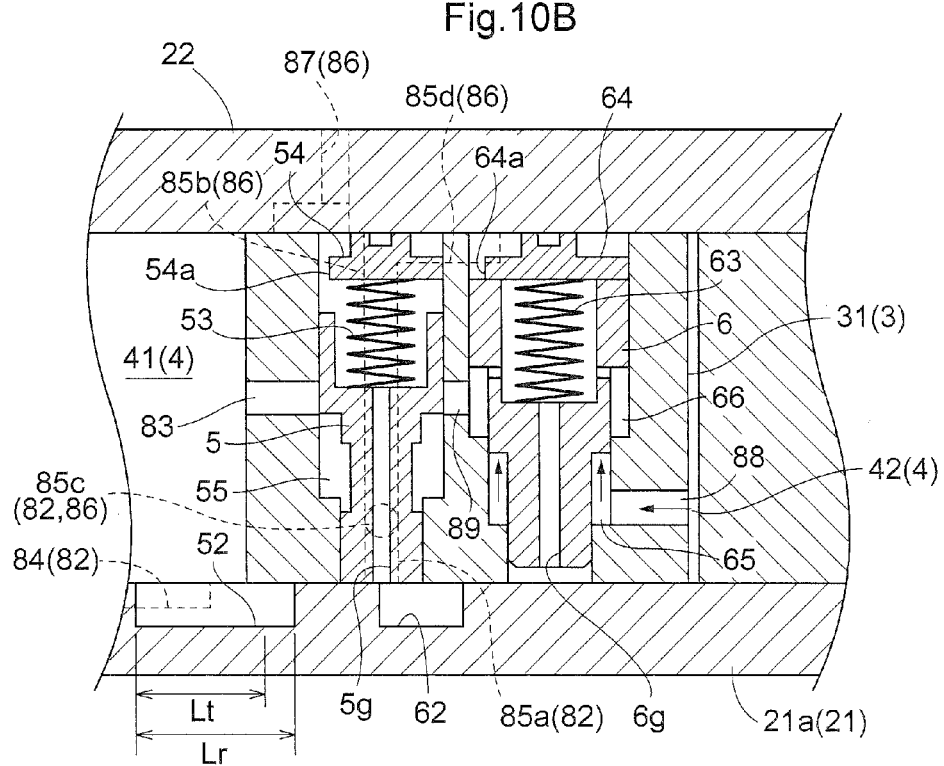

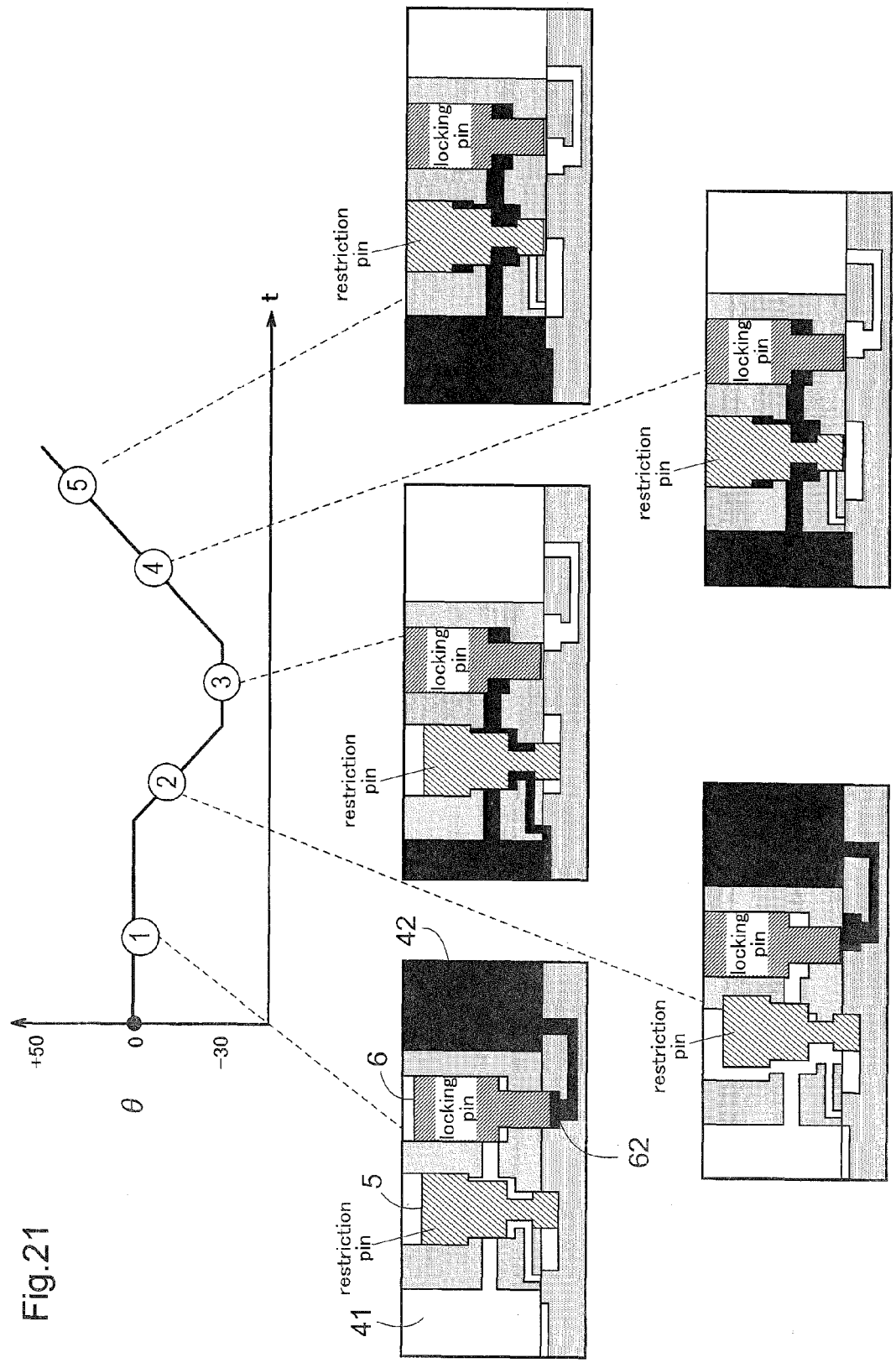

VALVE TIMING ADJUSTMENT SYSTEM

TECHNICAL FIELD

The present invention relates to valve timing adjustment systems that control the relative rotational phase of a driven-side rotating member relative to a driving-side rotating member that rotates in synchronization with a crankshaft in an internal combustion engine.

BACKGROUND ART

A valve timing control device is known that includes a hydraulic lock mechanism configured of a locking recess formed in a driven-side rotating member and a locking member capable of extending into/retracting from the locking recess, in order to hold a relative rotational phase (called simply a "rotational phase" hereinafter) of the driven-side rotating member relative to a driving-side rotating member in a predetermined intermediate rotational phase (a locked rotational phase or locked position). Here, the locking member being inserted into the locking recess will be referred to as locking or a locking operation, whereas the locking member retracting from the locking recess will be referred to as releasing the lock or a lock release operation. In this valve timing control device, when a locking request or a lock release request has occurred, it is necessary to control a hydraulic control valve so that an operation for displacing the relative rotational phase of the driven-side rotating member relative to the driving-side rotating member as well as the locking operation and the lock release operation can be carried out smoothly.

PTL 1 discloses a valve timing control device that controls both the displacement of the rotational phase and the operation of a locking pin using a single hydraulic control valve. In this device, a control means that controls a driving signal (driving current) to the hydraulic control valve divides a control region for the control of the hydraulic control valve into a plurality of control regions, and causes a driving current control property in at least one of the control regions to be different from the driving current control properties in the other control regions. Specifically, in control regions where it is necessary to ensure precise and stable phase displacement control, the driving current control response speed (time constant) is set to a range capable of preventing overshoot/hunting, whereas in control regions where a high level of responsiveness is required, the driving current control response speed (time constant) is set to increase responsiveness. For example, the responsiveness is increased in a locking pin control region where the locking pin is driven in a locking direction/lock release direction, whereas in a control region where the rotational phase is displaced to a target rotational phase set in accordance with driving conditions, the responsiveness is decreased to ensure precision and stability.

By setting different response speeds for locking operation/lock release operation control and rotational phase displacement control, this apparatus aims to optimize the performance of the respective operations. However, because the response speed in the locking operation/lock release operation control is changed after it has been determined that locking or a lock release has been requested, there is a problem in that proper valve timing control cannot be carried out if the timing of the determination is too early or too late.

PTL 2 discloses a control device for an internal combustion engine provided with a phase variation mechanism that enables the rotational phase of a camshaft relative to a crankshaft to be changed and a variable valve lift mechanism capable of continually changing the lift amount of an intake valve. This device provides separate modes for a low-load driving region and a high-load driving region, and the modes separate closing operations into a fast-closing operation and a slow-closing operation; settings for the timing at which the intake valve is closed and a target cylinder air amount are then changed. When the mode transits, the cylinder air amount is adjusted as appropriate, which not only makes it possible to prevent abnormal combustion with certainty, but also makes it possible to reduce pumping loss and increase the engine driving efficiency. However, although this device separates low-load and high-load driving regions, there is no mention of providing separate modes during operations for variable valve control, and no considerations are made for adjusting control modes in valve timing control.

PTL 3 discloses a valve timing control device including a phase conversion mechanism that displaces the relative phase (rotational phase) between a driving-side rotating member that rotates in synchronization with a crankshaft and a driven-side rotating member that rotates integrally with a camshaft by supplying/discharging a working fluid to/from two types of pressure chambers whose volumes vary in a complementary manner via a mobile partition, and a lock mechanism that uses the working fluid to both enable the relative phase to be fixed during an intermediate locked phase suited to internal combustion engine startup and enable the fixed phase to be released. A first control valve that controls the supply of working oil for rotational phase displacement and a second control valve that controls the supply of working oil for locking operations are provided. Optimal relative phases for engine driving states are held and stored in a control unit, and the configuration is such that the optimal relative phase can be obtained for driving states (engine RPM, coolant temperature, and the like) detected separately. Information such as whether an ignition key is on or off, information from an oil temperature sensor that detects an engine oil temperature, and so on are also inputted into the control unit. Although the valve timing control device is configured to calculate the optimal target relative phase (target rotational phase) based on the driving state, no specific mention is made regarding the computation of an operation amount for driving a hydraulic control valve for achieving the calculated target rotational phase. In particular, no consideration is given to controlling the hydraulic control valve so that operations for displacing the rotational phase, locking operations, and lock release operations can be carried out smoothly.

CITATION LIST

Patent Literatures

PTL 1: JP 2011-058444A (paragraphs [0002-0011] [0043-0049]; FIG. 9)
PTL 2: JP 2009-243372A (paragraphs [0029-0125]; FIGS. 5 and 12)
PTL 3: JP 2009-074384A (paragraphs [0012-0040]; FIG. 1)

SUMMARY OF INVENTION

Technical Problem

In light of the aforementioned circumstances, it is an object of the present invention to improve upon the conventional valve timing control so that operations for displacing a rotational phase, locking operations, and lock release operations can be carried out smoothly.

Solution to Problem

To achieve the aforementioned object, a valve timing adjustment system according to the present invention includes a displacement mechanism unit that displaces a rotational phase of a camshaft relative to a crankshaft of an internal combustion engine, a locking mechanism unit that locks the rotational phase at an intermediate locked phase positioned within a displacement range of the rotational phase, a hydraulic pathway including a hydraulic control valve that hydraulically drives the displacement mechanism unit and the locking mechanism unit, and a control unit including a control system that controls operations of the hydraulic control valve; here, the control unit changes a temporal responsiveness of the control system based on a displacement force that displaces the rotational phase.

According to this configuration, the temporal responsiveness of the control system is changed based on the displacement force that displaces the rotational phase of the camshaft relative to the crankshaft, which makes it possible to carry out control in accordance with the respective properties, and makes it possible to control the hydraulic control valve so that operations for displacing the rotational phase as well as a locking operation and a lock release operation can be carried out with certainty. Fluctuations in cam torque acting on a rotor, oil pressure acting on a rotor, and so on can be given as examples of the displacement force.

According to a preferred embodiment of the present invention, the control unit switches the temporal responsiveness of the control system between a retard control mode that displaces the rotational phase in a retard direction and an advance control mode that displaces the rotational phase in an advance direction.

According to this configuration, the rotational phase displacement control for displacing the rotational phase in the advance direction or the retard direction is divided into control for moving in the retard direction and control for moving in the advance direction, which makes it possible to carry out control in accordance with the respective properties, and makes it possible to control the hydraulic control valve so that operations for displacing the rotational phase as well as a locking operation and a lock release operation can be carried out with certainty.

According to a preferred embodiment of the present invention, the temporal responsiveness is changed so that the temporal responsiveness in the advance control mode is faster than the temporal responsiveness in the retard control mode. This characteristic is introduced based on the inventors finding that in valve timing control in an internal combustion engine such as in an automobile, the rotational phase moving in the advance direction corresponds to a driver depressing the accelerator pedal, and thus a high temporal responsiveness (a high response speed) is required. On the other hand, a fast temporal responsiveness is not required when the rotational phase moves in the retard direction. In other words, a control mode that makes locking control certain is set when moving in the retard direction (a retard control mode), and a control mode that prioritizes a high temporal responsiveness is set when moving in the advance direction (a advance control mode). Accordingly, the valve timing adjustment system control system can carry out locking hydraulic control on the locking mechanism unit with certainty while ensuring the necessary responsiveness.

Meanwhile, the temporal responsiveness of the movement of a spool of the hydraulic control valve and of the movement of the rotational phase displacement mechanism unit and the locking mechanism unit (the rotational phase, the locking operation, and the lock release operation) caused by the pressure of oil supplied from the hydraulic control valve vary depending on the hydraulic properties. In order to eliminate system instability caused by such fluctuations, according to a preferred embodiment of the present invention, a property obtainment unit that obtains property information regarding dynamic hydraulic properties of the hydraulic pathway is provided, and the temporal responsiveness of the control system is changed based on the property information.

The oil temperature and oil pressure in the hydraulic pathway, the RPM of a hydraulic pump, a degree of oil degradation, and so on can be given as examples of the property information that determines the values of the dynamic hydraulic properties, and thus it is preferable to employ a configuration in which the property information includes at least one of the oil temperature and oil pressure in the hydraulic pathway, the RPM of the hydraulic pump, and the degree of oil degradation. However, if additional costs are taken into consideration, it is favorable to use the oil temperature and oil pressure in the hydraulic pathway, the RPM of the hydraulic pump, and the degree of oil degradation already obtained for other purposes.

According to a further preferable embodiment of the present invention, the control unit includes an oil degradation degree evaluation unit that evaluates a degree of degradation of working oil in the hydraulic pathway, and the temporal responsiveness of the control system is changed based on the degree of degradation.

When the working oil (also simply called oil) in the hydraulic pathway degrades, the dynamic hydraulic properties in the hydraulic pathway, and particularly in the hydraulic control valve, change; as a result, the temporal responsiveness involving the hydraulic control valve also changes, and thus the certainty of the operations for displacing the rotational phase as well as the locking operation and the lock release operation drops. According to the above configuration of the present invention, this problem is solved by evaluating the degree of degradation of the working oil in the hydraulic pathway including the hydraulic control valve and changing the temporal responsiveness of the control system based on the evaluated degree of degradation. For example, when the viscosity of the working oil drops, the temporal responsiveness of the hydraulic control system including the hydraulic control valve also drops; this drop, however, can be compensated for by making a corresponding increase in the temporal responsiveness of the control system that outputs the driving signal to the hydraulic control valve. Through this, the certainty of the operations for displacing the rotational phase as well as the locking operation and the lock release operation can be ensured over a long period of time, regardless of changes in environmental conditions.

Furthermore, considering that feedback control systems are often used as control systems in conventional valve timing adjustment systems, it is favorable for the changing of the temporal responsiveness according to the present invention to be realized by changing a time constant of a feedback control system.

In the case where a feedback control system is used as the control system of the valve timing adjustment system, the changing of the temporal responsiveness according to the present invention is realized simply and with certainty by changing the temporal responsiveness of the feedback control system. Therefore, according to a preferred embodiment of the present invention, the control system is configured as a feedback control system that brings an actual value of the rotational phase closer to a target value of the rotational phase by feeding back the actual value of the rotational phase, and the control unit is provided with a map for deriving a control constant that determines the temporal responsiveness of the control system that outputs a driving signal to the hydraulic control valve using at least the degree of degradation as an input parameter. By creating such a map in advance, a control system capable of compensating for changes in the degree of degradation can be realized with ease. Meanwhile, in the case where the temporal responsiveness of the control system is also to depend on other parameters such as the target rotational phase, a map for deriving a control constant for determining the temporal responsiveness may be created using the target rotational phase as an input parameter.

Degradation in the working oil in an automobile internal combustion engine depends on the travel distance thereof and the amount of time that has passed since the last oil change. The internal combustion engine (engine) has an oil filter; the oil filter functions properly for a predetermined distance following the oil change, absorbing foreign objects, and thus there is little oil degradation. However, oxidation, carbonization, oil amount drop, and so on occurs due to the influence of engine heat, which in turn cause oil degradation. Furthermore, the oil filter is designed to absorb foreign objects in the oil, and the absorption performance thereof decreases with use; the oil degradation proceeds quadratically with travel beyond the predetermined distance. In light of this, an oil degradation curve corresponding to the travel distance can be estimated in advance.

Meanwhile, although not as marked as the oil degradation caused by the travel distance, the oil itself oxidizes after a long amount of time has passed, and thus an oil degradation curve corresponding to the amount of time that has passed since the last oil change can be estimated in advance as well.

In light of this, according to a preferred embodiment of the present invention, the oil degradation degree evaluation unit calculates the degree of degradation based on a travel distance of a vehicle driven by the internal combustion engine. According to another preferred embodiment of the present invention, the oil degradation degree evaluation unit calculates the degree of degradation based on an amount of time that has passed since an oil change in a vehicle driven by the internal combustion engine.

Of course, the two methods for calculating the degree of degradation may be combined. If the degree of degradation is derived from the travel distance of the vehicle and/or the amount of time that has passed since the last oil change and a map that derives a change instruction value for changing the temporal responsiveness of the control system is created in advance based on the derived degree of degradation, the certainty of the operations for displacing the rotational phase as well as the locking operation and the lock release operation can be ensured using a simple configuration and regardless of long-term degradation in the working oil.

BRIEF DESCRIPTION OF DRAWINGS

FIG. 4 is an exploded view illustrating the configuration of a restriction mechanism and a lock mechanism.

FIG. 10A is a plan view illustrating states of the restriction mechanism and the lock mechanism in a normal driving state.

FIG. 10B is a cross-sectional view illustrating states of the restriction mechanism and the lock mechanism in a normal driving state.

FIG. 21 is a schematic diagram illustrating a rotational phase displacement process from startup to lock release.

DESCRIPTION OF EMBODIMENTS

First Embodiment

Figure 1:
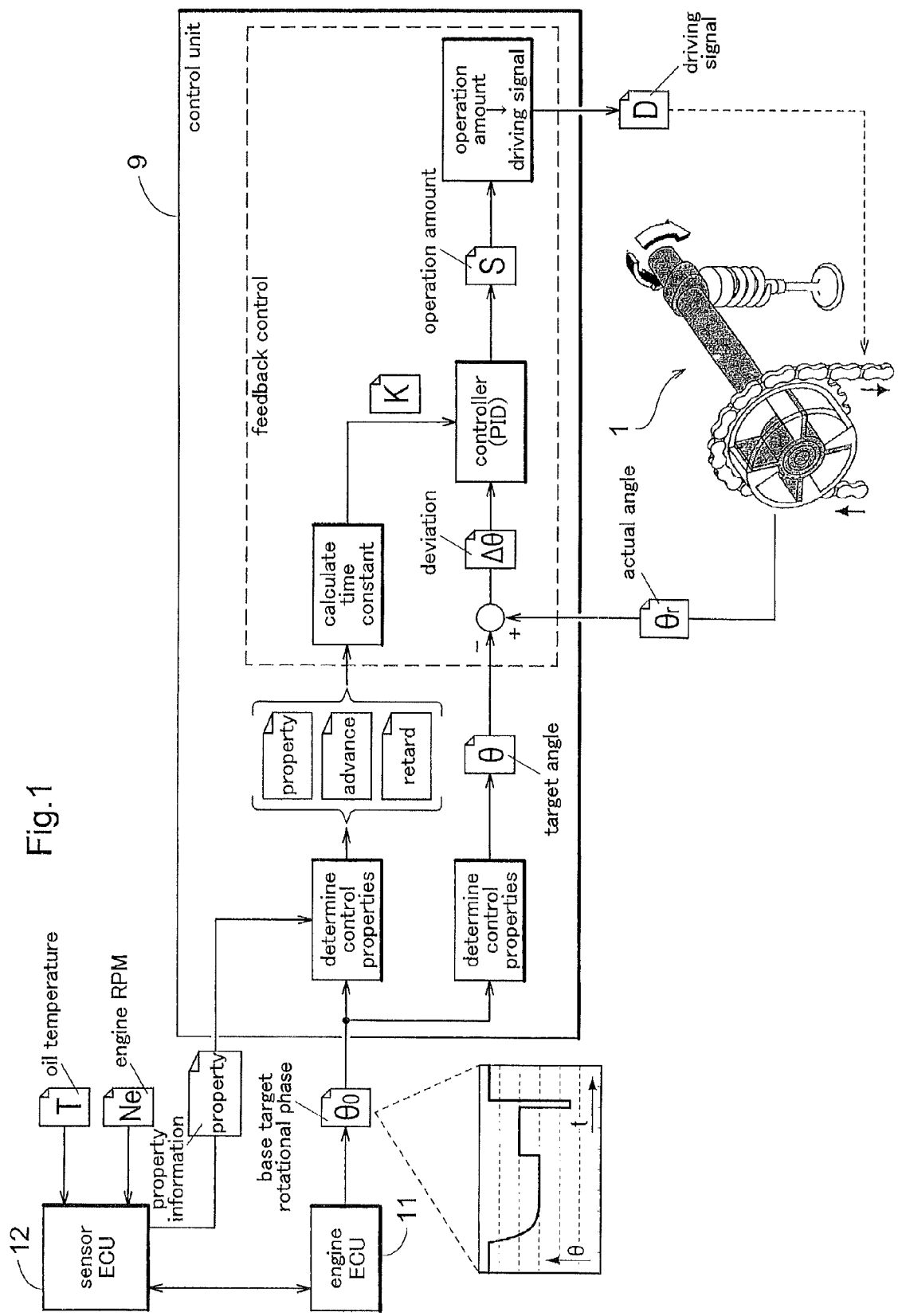
FIG. 1 is a schematic diagram illustrating the overall flow of basic control performed by a valve timing adjustment system according to a first embodiment.
Figure 2:
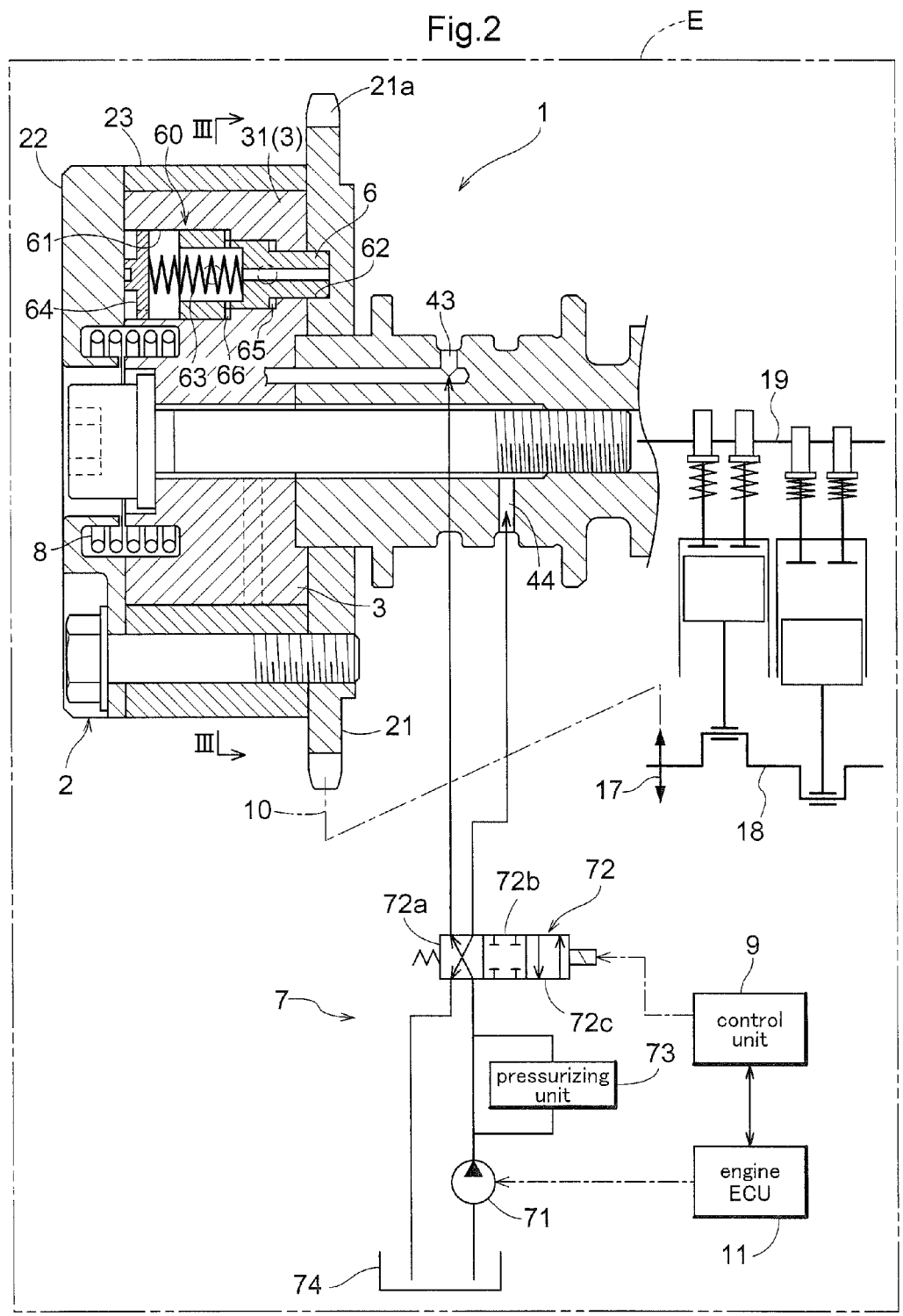
FIG. 2 is a cross-sectional view illustrating the overall configuration of a valve timing control device, seen from the side.

Before describing a first embodiment of a valve timing adjustment system according to the present invention, an overall description of the invention will be given using the schematic diagram in FIG. 1. This system includes a valve timing adjustment mechanism ("VVT mechanism" hereinafter) 1 that is controlled by a control unit 9. Although specific descriptions will be given later, the VVT mechanism 1 includes a displacement mechanism unit that displaces the rotational phase of a camshaft 19 relative to a crankshaft 18 of an internal combustion engine (also referred to simply as an engine) E in an advance direction D1 or a retard direction D2, and a locking mechanism unit 60 (not shown in FIG. 1) that locks the rotational phase at an intermediate locked phase positioned within a displacement range of the rotational phase. The displacement mechanism unit and the locking mechanism unit 60 are operated by a hydraulic control valve 72 (not shown in FIG. 1) whose driving is controlled by a driving signal (for example, a PWM signal). The control unit 9 configures a feedback control system that outputs the driving signal to the hydraulic control valve 72 based on a base target rotational phase (indicated by θ0 in FIG. 1) that serves as a rotational phase control target provided by an engine ECU 11.

An important characteristic of this invention is that the control unit 9 has a retard control mode that displaces the rotational phase in the retard direction D2 and an advance control mode that displaces the rotational phase in the advance direction D1, and switches the temporal responsiveness of the feedback control system between the retard control mode and the advance control mode. In this embodiment, the advance control mode provides a faster temporal responsiveness than the retard control mode. In the feedback control system shown in FIG. 1, the temporal responsiveness is adjusted by adjusting a time constant. Accordingly, the adjustment of the temporal responsiveness is carried out by providing an advance direction coefficient (indicated by "advance" in FIG. 1) having a value that reduces a reference time constant during the advance control mode and providing a retard direction coefficient (indicated by "retard" in FIG. 1) having a value that increases the reference time constant during the retard control mode. The time constant adjusted by the advance direction coefficient or the retard direction coefficient is provided to a controller configured as a PID here. As a result, an operation amount providing a high temporal responsiveness is computed and outputted during the advance control mode. The displacement of the rotational phase in the advance direction D1 that determines the advance control mode is linked to an event corresponding to a driver depressing an accelerator pedal, and thus a high control amount responsiveness is obtained as a result of the operation amount providing a high temporal responsiveness, resulting in highly-responsive driving. Conversely, an operation amount providing a low temporal responsiveness is computed and outputted during the retard control mode. The displacement of the rotational phase in the retard direction D2 that determines the retard control mode is often linked to an event corresponding to the locking mechanism unit 60 performing a locking operation or releasing a lock, and thus a slower temporal responsiveness increases the certainty of the locking operation or the lock release.

Selecting the retard control mode or the advance control mode, or in other words, displacing the rotational phase in the retard direction D2 or displacing the rotational phase in the advance direction D1, can be determined based on an actual rotation displacement position, which is a measured value of rotational displacement actually detected by the VVT mechanism 1, and a next target rotational displacement position. Note that the rotational phase is measured as an angle (in degrees), and thus the specification also refers to the rotational phase as an angle, with the same meaning. It is also possible to select between the retard control mode and the advance control mode based on fluctuations in cam torque (an example of displacement force) acting on an inner rotor 3 through the camshaft 19.

As an option, another adjustment parameter for adjusting the temporal responsiveness is prepared in the control unit 9. This adjustment parameter is property information (indicated as "property" in FIG. 1) regarding dynamic hydraulic properties of a hydraulic pathway 7 including the hydraulic control valve 72 that controls the operation of the VVT mechanism 1. The temporal responsiveness of the movement of the spool of the hydraulic control valve 72 and of the movement of the displacement mechanism unit and the locking mechanism unit 60 (the rotational phase, the locking operation, and the lock release operation) caused by the pressure of the oil supplied from the hydraulic control valve 72 vary depending on the dynamic hydraulic properties. Because such variations are considered to be control system disturbances, a correction coefficient for compensating for the disturbances is calculated based on the property information, and the reliability of the control amount is improved by adjusting the time constant using the correction coefficient. Although the oil temperature and oil pressure in the hydraulic pathway 7, the RPM of a hydraulic pump 71, oil degradation, and so on can be given as examples of the property information that determines the value of the dynamic hydraulic properties, data obtained for other purposes can be used favorably.

An oil temperature: T in the hydraulic pathway 7 and an engine RPM: Ne that corresponds to the RPM of the hydraulic pump 71 are used here. The engine RPM: Ne is continuously detected for engine control, and the RPM of the hydraulic pump 71, which is related to the engine RPM: Ne, is also related to the oil pressure, thus has value as the property information. In the case where the oil pressure is detected by an oil pressure sensor or the like, the oil pressure can be used instead of the engine RPM: Ne. Note that the oil pressure (an example of displacement force) acting on the inner rotor 3 can be used as information for selecting the retard control mode and the advance control mode in addition to being used as the property information for determining the value of the dynamic hydraulic properties.

Note that if a map for deriving the correction coefficient for adjusting the time constant is created in advance using the stated property information and the direction of the rotational phase displacement (the retard direction D2 or the advance direction D1) as input parameters, the time constant can be rapidly calculated with a low processing load.

A feedback system itself has a well-known configuration, and an operation amount: S is computed based on a deviation (indicated by Δθ in FIG. 1) as a difference between an actual angle (indicated by θr in FIG. 1) corresponding to a measured value of the rotational phase in the VVT mechanism 1 (an actual value of the rotational phase) and a target angle (indicated by θ in FIG. 1) corresponding to a target value of the rotational phase. Furthermore, a driving signal: D is generated from the computed operation amount and is outputted to the hydraulic control valve 72.

Embodiments of the present invention will be described based on FIGS. 2 to 13. First, the overall configuration of the VVT mechanism 1 will be described based on FIG. 2 and FIG. 3.

(Overall Configuration)

The VVT mechanism 1 includes an outer rotor 2 serving as a driving-side rotating member that rotates in synchronization with the crankshaft 18 of the engine E, and the inner rotor 3 serving as a driven-side rotating member that is disposed coaxially with the outer rotor 2 and that rotates in synchronization with a camshaft 19.

The outer rotor 2 is configured of a rear plate 21 attached on a side to which the camshaft 19 is connected, a front plate 22 attached on the opposite side as the side to which the camshaft 19 is connected, and a housing 23 sandwiched between the rear plate 21 and the front plate 22. The inner rotor 3 housed within the outer rotor 2 is assembled integrally with a leading end portion of the camshaft 19, and is capable of rotating relative to the outer rotor 2 within a set range.

Figure 3:
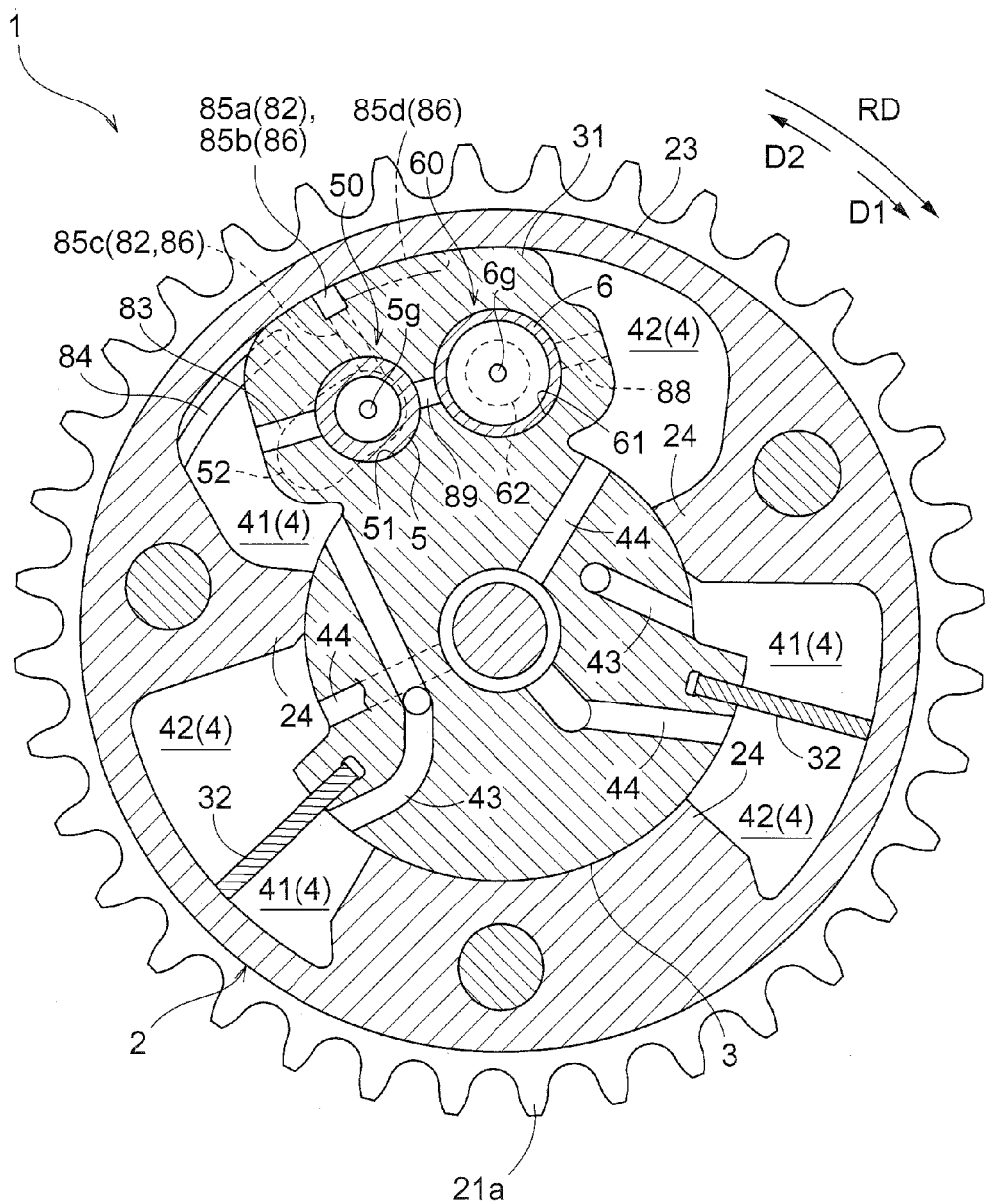
FIG. 3 is a cross-sectional view taken along the III-III line shown in FIG. 2.

When the crankshaft 18 is rotationally driven, a resulting rotational driving force is transmitted to an output sprocket 17 provided in the crankshaft 18 and a sprocket portion 21a in the rear plate 21 via a power transmission member 10 wrapped around the output sprocket 17, and the outer rotor 2 is rotationally driven in a direction indicated by RD in FIG. 3. The inner rotor 3 is rotationally driven in the RD direction in response to the outer rotor 2 being rotationally driven, and the camshaft 19 rotates as a result.

A plurality of projecting portions 24 that project in an inner radial direction are formed in the housing 23 of the outer rotor 2 so as to be spaced relative to each other along a circumferential direction. Hydraulic chambers 4 are formed by the projecting portions 24 and the inner rotor 3. Although the hydraulic chambers 4 are provided in three locations in the present embodiment, the invention is not limited thereto.

Each of the hydraulic chambers 4 is divided into an advance chamber 41 and a retard chamber 42 by a partition portion 31 that forms part of the inner rotor 3 or vanes 32 attached to the inner rotor 3. A restriction member 5 and a lock member 6 are housed in a restriction member housing portion 51 and a lock member housing portion 61, respectively, that are formed in the partition portion 31, and a restriction mechanism 50 and the locking mechanism unit 60 are respectively configured of those corresponding elements. Note that in the present invention, an overall mechanism that carries out rotational displacement in the advance direction D1 and the retard direction D2 is called a "displacement mechanism unit". The restriction mechanism 50 is also included in the displacement mechanism unit. The configurations thereof will be described later.

An advance passage 43 formed in the inner rotor 3 communicates with the advance chamber 41. Likewise, a retard passage 44 formed in the inner rotor 3 communicates with the retard chamber 42. The advance passage 43 and the retard passage 44 supply or discharge working oil to or from the advance chamber 41 and the retard chamber 42, respectively, via the hydraulic pathway 7, causing oil pressure to act on the partition portion 31 or the vanes 32 that serve as primary elements of the displacement mechanism unit. In this manner, the relative rotational phase of the inner rotor 3 relative to the outer rotor 2 is displaced in the advance direction D1 or the retard direction D2 indicated in FIG. 3, or is held at a given phase. Note that engine oil is typically used as the working oil.

The set range in which the outer rotor 2 and the inner rotor 3 can rotate relative to each other corresponds to a range over which the partition portion 31 or the vanes 32 can displace within the hydraulic chambers 4. A maximum volume of the advance chamber 41 corresponds to a maximum advance phase, and a maximum volume of the retard chamber 42 corresponds to a maximum retard phase. In other words, the relative rotational phase can change between a maximum advance phase and a maximum retard phase.

A torsion spring 8 is provided spanning across the inner rotor 3 and the front plate 22. The inner rotor 3 and the outer rotor 2 are biased by the torsion spring 8 so that the relative rotational phase is displaced in the advance direction D1.

Next, the configuration of the hydraulic pathway 7 will be described. The hydraulic pathway 7 includes the hydraulic pump 71 that is driven by the engine E to supply the working oil, the solenoid-based hydraulic control valve 72 that controls the supply and discharge of the working oil to and from the advance passage 43 and the retard passage 44, a pressurizing unit 73 that increases the pressure of the working oil from the hydraulic pump 71, and a tank 74 that holds the working oil.

The hydraulic control valve 72 operates based on a driving signal outputted from the control unit 9. The hydraulic control valve 72 has a first position 72a at which advance control is carried out by permitting the working oil to be supplied to the advance passage 43 and permitting the working oil to be discharged from the retard passage 44, a second position 72b at which phase holding control is carried out by prohibiting the working oil from being supplied to/discharged from the advance passage 43 and the retard passage 44, and a third position 72c at which retard control is carried out by permitting the working oil to be discharged from the advance passage 43 and permitting the working oil to be supplied to the retard passage 44. The hydraulic control valve 72 operates based on a driving signal outputted from the control unit 9. The hydraulic control valve 72 according to the present embodiment is configured to carry out advance control at the first position 72a when there is no driving signal from the control unit 9.

(Restriction Mechanism)

The configuration of the restriction mechanism 50 that restricts the relative rotational phase to a range from the maximum retard phase to an intermediate locked phase (called a "restriction range Lr" hereinafter) will be described based on FIG. 4. The intermediate locked phase refers to the relative rotational phase when locked by the locking mechanism unit 60, which will be mentioned later.

The restriction mechanism 50 is primarily configured of the stepped, cylindrical restriction member 5, the restriction member housing portion 51 that houses the restriction member 5, and a restriction recess 52 having a long-hole shape formed in a surface of the rear plate 21 so that the restriction member 5 can be inserted thereinto.

The restriction member 5 has a shape in which four cylinders of different diameters are stacked so as to form four steps. These cylinders forming four steps will be referred to as a first step portion 5a, a second step portion 5b, a third step portion 5c, and a fourth step portion 5d, in that order from the side where the rear plate 21 is located. The second step portion 5b is configured having a lower diameter than the first step portion 5a, and the second step portion 5b, the third step portion 5c, and the fourth step portion 5d are configured so that the diameters thereof increase in that order from the side on which the front plate 22 is located. Note that the third step portion 5c is provided to reduce the volume of a first hydraulic chamber 55 and improve the operability of the restriction member 5 when the working oil is supplied to the first hydraulic chamber 55.

The first step portion 5a is formed so as to be capable of being inserted into the restriction recess 52, and the relative rotational phase is restricted within the restriction range Lr when the first step portion 5a is inserted into the restriction recess 52. A cylindrical recess portion 5f is formed in the fourth step portion 5d, and a spring 53 is contained therein. In addition, a through-hole 5g is formed in a central area of the restriction member 5 in order to reduce the resistance of the working oil when the restriction member 5 moves in the direction of the bias and accordingly improve the operability.

A plug member 54 is provided between the restriction member 5 and the front plate 22, and the spring 53 is attached between the plug member 54 and a bottom surface of the recess portion 5f. A cutout portion 54a formed in the plug member 54 makes it possible to discharge the working oil outside of the VVT mechanism 1 through a discharge flow path, which is not shown, when the restriction member 5 moves toward the front plate 22, and contributes to improving the operability of the restriction member 5.

The restriction member housing portion 51 is formed in the inner rotor 3 along a direction of the rotational core of the camshaft 19 (called simply a "rotational core" hereinafter), and passes through the inner rotor 3 from the side on which the front plate 22 is located to the side on which the rear plate 21 is located. The restriction member housing portion 51 is formed having a shape in which, for example, two cylindrical spaces of different diameters are stacked so as to form two steps, so that the restriction member 5 can move within the inner space thereof.

The restriction recess 52 is formed having a rounded arc shape centered on the rotational core, and is formed so that a position in the radial direction thereof is slightly different from that of a locking recess 62, which will be mentioned later. The restriction recess 52 is configured so that the relative rotational phase is the intermediate locked phase when the restriction member 5 is in contact with a first end portion 52a and so that the relative rotational phase is the maximum retard phase when the restriction member 5 is in contact with a second end portion 52b. In other words, the restriction recess 52 corresponds to the restriction range Lr.

The restriction member 5 is housed within the restriction member housing portion 51 and is continually biased toward the rear plate 21 by the spring 53. When the first step portion 5a of the restriction member 5 is inserted into the restriction recess 52, the relative rotational phase is restricted to the range of the restriction range Lr, thus achieving a "restricted state". When the first step portion 5a retracts from the restriction recess 52 against the biasing force of the spring 53, the restricted state is lifted, thus achieving a "restriction-lifted state".

When the restriction member 5 is housed within the restriction member housing portion 51, the first hydraulic chamber 55 is formed between the restriction member 5 and the restriction member housing portion 51. When the working oil is supplied to the first hydraulic chamber 55 and the oil pressure acts on a first pressure receiving surface 5e, the restriction member 5 moves toward the front plate 22 against the biasing force of the spring 53, resulting in the restriction-lifted state. A configuration of a flow path for supplying/discharging the working oil to/from the first hydraulic chamber 55 will be described later.

(Locking Mechanism Unit)

The configuration of the locking mechanism unit 60 that locks the relative rotational phase in the intermediate locked phase will be described based on FIG. 4. The locking mechanism unit 60 is primarily configured of the stepped cylindrical lock member 6, the lock member housing portion 61 that houses the lock member 6, and the round hole-shaped locking recess 62 formed in the surface of the rear plate 21 so that the lock member 6 can be inserted thereinto.

The lock member 6 has a shape in which, for example, cylinders of different diameters are stacked so as to form three steps. These cylinders forming three steps will be referred to as a first step portion 6a, a second step portion 6b, and a third step portion 6c, in that order from the side where the rear plate 21 is located. The first step portion 6a, the second step portion 6b, and the third step portion 6c are configured so that the diameters thereof increase in that order.

The first step portion 6a is formed so as to be capable of being inserted into the locking recess 62, and the relative rotational phase is locked in the intermediate locked phase when the first step portion 6a is inserted into the locking recess 62. A cylindrical recess portion 6f is formed spanning the third step portion 6c and part of the second step portion 6b, and a spring 63 is housed therein. In addition, a through-hole 6g is formed in a central area of the lock member 6 in order to reduce the resistance of the working oil when the lock member 6 moves in the direction of the bias and accordingly improve the operability.

A plug member 64 is provided between the lock member 6 and the front plate 22, and the spring 63 is attached between the plug member 64 and a bottom surface of the recess portion 6f. A cutout portion 64a formed in the plug member 64 makes it possible to discharge the working oil outside of the VVT mechanism 1 through a discharge flow path, which is not shown, when the lock member 6 moves toward the front plate 22, and contributes to improving the operability of the lock member 6.

The lock member housing portion 61 is formed in the inner rotor 3 along the direction of the rotational core, and passes through the inner rotor 3 from the side on which the front plate 22 is located to the side on which the rear plate 21 is located. The lock member housing portion 61 is formed having a shape in which cylindrical spaces of different diameters are stacked so as to form three steps, so that the lock member 6 can move within the inner space thereof.

The lock member 6 is housed within the lock member housing portion 61 and is continually biased toward the rear plate 21 by the spring 63. When the first step portion 6a of the lock member 6 is inserted into the locking recess 62, the relative rotational phase is locked in the intermediate locked phase, thus achieving a "locked state". When the first step portion 6a retracts from the locking recess 62 against the biasing force of the spring 63, the locked state is released, thus achieving a "lock-released state".

When the lock member 6 is housed within the lock member housing portion 61, a second hydraulic chamber 65 and a third hydraulic chamber 66 are formed by the lock member 6 and the lock member housing portion 61. When the working oil is supplied to the second hydraulic chamber 65 and the oil pressure acts on a second pressure receiving surface 6d, the lock member 6 moves toward the front plate 22 against the biasing force of the spring 63, resulting in the lock-released state. Meanwhile, when the working oil is supplied to the third hydraulic chamber 66 and the oil pressure acts on a third pressure receiving surface 6e, the lock member 6 is held in the lock-released state. A configuration of a flow path for supplying/discharging the working oil to/from the second hydraulic chamber 65 and the third hydraulic chamber 66 will be described later.

Next, a restriction lifting flow path, a drain flow path 86, a lock release flow path 88, and a communication flow path 89 will be described based on FIG. 4 and FIG. 5.

(Restriction Lifting Flow Path)

A restriction lifting flow path for achieving the restriction-lifted state includes a restriction communication channel 82 and a lifting communication channel 83. The restriction communication channel 82 is configured of a rear plate channel 84, a first through-channel 85a, and a supply path 85c, and is a flow path for supplying the working oil to the first hydraulic chamber 55 in order to lift the restricted state. Meanwhile, the lifting communication channel 83 is a channel for supplying the working oil to the first hydraulic chamber 55 in order to hold the restriction-lifted state when the restriction member 5 is retracted from the restriction recess 52.

The rear plate channel 84 is a groove-shaped channel formed in a surface of the rear plate 21 on the side toward the inner rotor 3, and communicates with the advance chamber 41. The rear plate channel 84 is configured to be capable of communicating with the first through-channel 85a that forms part of a rotor channel 85, only when the restriction member 5 is within a predetermined range on the advance-side of the restriction range Lr (called a "restriction liftable range Lt" hereinafter). Note that the restriction member 5 being within the range of the restriction liftable range Lt corresponds to the first step portion 5a being completely located within the region of the restriction liftable range Lt.

The rotor channel 85 is a channel formed in the inner rotor 3, and is configured of the first through-channel 85a, a second through-channel 85b, the supply path 85c, and a discharge path 85d. The first through-channel 85a and the second through-channel 85b are formed in a side surface of the inner rotor 3 on the outer side thereof in the radial direction, and are formed so as to form a continuous straight line along the direction of the rotational core. An end portion of the first through-channel 85a on the side thereof toward the rear plate 21 is configured to communicate with the rear plate channel 84 when the restriction member 5 is within the restriction liftable range Lt. Meanwhile, an end portion of the second through-channel 85b on the side thereof toward the front plate 22 is connected to the discharge path 85d. The supply path 85c branches at a border area between the first through-channel 85a and the second through-channel 85b, and communicates with the first hydraulic chamber 55. The discharge path 85d is formed in the surface of the inner rotor 3 on the side thereof located toward the front plate 22, in an L shape when viewed from above, and is configured to communicate with a discharge hole 87, which will be mentioned later, only when the restriction member 5 is in a predetermined range on the advance-side relative to the restriction liftable range Lt.

As described above, the restriction communication channel 82 is configured of the rear plate channel 84, the first through-channel 85a, and the supply path 85c. Accordingly, when the restriction member 5 is within the restriction liftable range Lt, the rear plate channel 84 and the first through-channel 85a communicate with each other, causing the restriction communication channel 82 to communicate with the first hydraulic chamber 55 and the working oil to be supplied thereto; as a result, the oil pressure acts on the first pressure receiving surface 5e and the restricted state is lifted.

The lifting communication channel 83 is a pipe-shaped channel formed in the inner rotor 3, and communicates with the advance chamber 41. When the restriction member 5 retracts from the restriction recess 52 and the restriction lifted state is achieved, the lifting communication channel 83 communicates with the first hydraulic chamber 55 and supplies the fluid from the advance chamber 41; as a result, the oil pressure acts on the first pressure receiving surface 5e and the restriction lifted state is held.

Note that the configuration is such that when the restriction member 5 moves toward the front plate 22 against the biasing force of the spring 53, the communication between the supply path 85c and the first hydraulic chamber 55 is cut off by the first step portion 5a at the timing when the lifting communication channel 83 communicates with the first hydraulic chamber 55. In other words, the channel that supplies the working oil to the first hydraulic chamber 55 is configured to alternate between the restriction communication channel 82 and the lifting communication channel 83. According to this configuration, in the case where the working oil is to be discharged from the first hydraulic chamber 55, the supply of the working oil from the lifting communication channel 83 can be cut off while still discharging the working oil from the first hydraulic chamber 55 via the supply path 85c (which is part of the drain flow path 86, which will be mentioned later).

However, strictly speaking, the configuration is such that the working oil is supplied to the first hydraulic chamber 55 from both the restriction communication channel 82 and the lifting communication channel 83 when switching between the restriction communication channel 82 and the lifting communication channel 83. This is to prevent a situation where neither the restriction communication channel 82 nor the lifting communication channel 83 is connected to the first hydraulic chamber 55 when switching between those communication channels, causing the first hydraulic chamber 55 to become temporarily sealed and losing the smoothness of the restriction/lifting operations of the restriction member 5.

(Drain Flow Path)

The drain flow path 86 is a channel for quickly discharging the working oil within the first hydraulic chamber 55 when the restriction member 5 is inserted into the restriction recess 52, which oil would otherwise exert movement resistance to the restriction member 5. The drain flow path 86 is configured of the supply path 85c, the second through-channel 85b, the discharge path 85d, and the discharge hole 87. The discharge hole 87 is formed to pass through the front plate 22 along the direction of the rotational core.

The drain flow path 86 is configured so as to communicate only when the restriction member 5 is in a predetermined range on the advance-side relative to the restriction liftable range Lt and to not communicate when the restriction member 5 is within the restriction liftable range Lt. According to this configuration, the working oil supplied from the advance chamber 41 is prevented from being discharged directly through the drain flow path 86 when the rear plate channel 84 and the first through-channel 85a communicate.

(Lock Release Flow Path)

The lock release flow path 88 is a pipe-shaped channel formed in the inner rotor 3, and communicates with the retard chamber 42. The lock release flow path 88 is a flow path for supplying the working oil to the second hydraulic chamber 65 from the retard chamber 42 and causing the oil pressure to act on the second pressure receiving surface 6d, which in turn causes the lock member 6 to retract from the locking recess 62.

(Communication Flow Path)

The communication flow path 89 is a pipe-shaped channel formed in the inner rotor 3, and is configured so that the first hydraulic chamber 55 and the third hydraulic chamber 66 communicate when the lock member 6 has moved toward the front plate 22 by a certain amount during the restriction-lifted state. When the lifting communication channel 83, the first hydraulic chamber 55, the communication flow path 89, and the third hydraulic chamber 66 communicate, the working oil supplied to the first hydraulic chamber 55 from the advance chamber 41 is also supplied to the third hydraulic chamber 66, and thus the restriction-lifted state and the lock-released state can be held.

(Operations During Lock Release and Restriction Lift)

A procedure for releasing the locked state using the restriction mechanism 50, the locking mechanism unit 60, and the respective flow channels described above will be described based on FIG. 5 to FIG. 8.

Figure 5A:
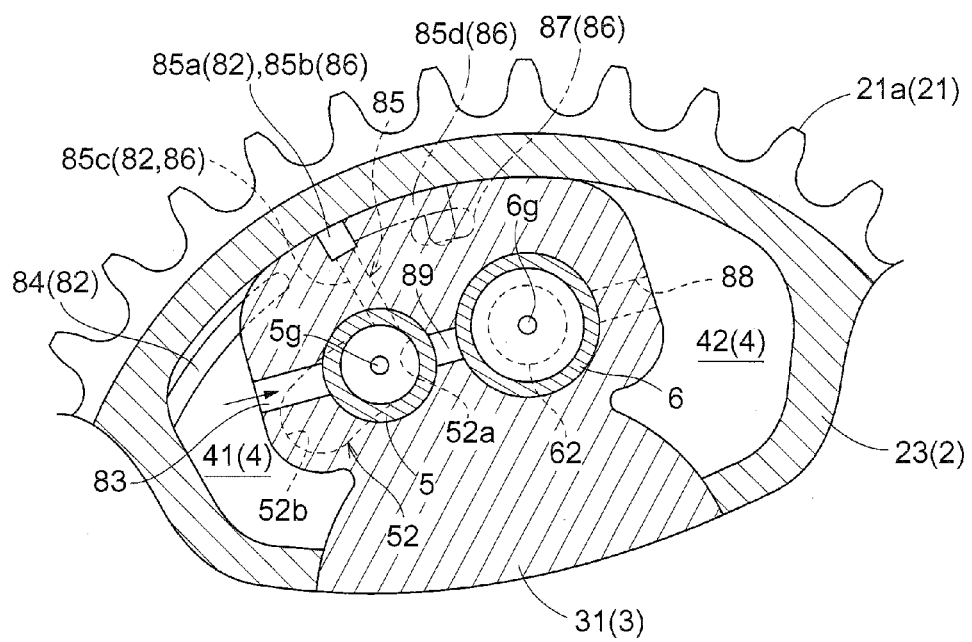
FIG. 5A is a plan view illustrating states of the restriction mechanism and the lock mechanism when an engine is started.
Figure 5B:
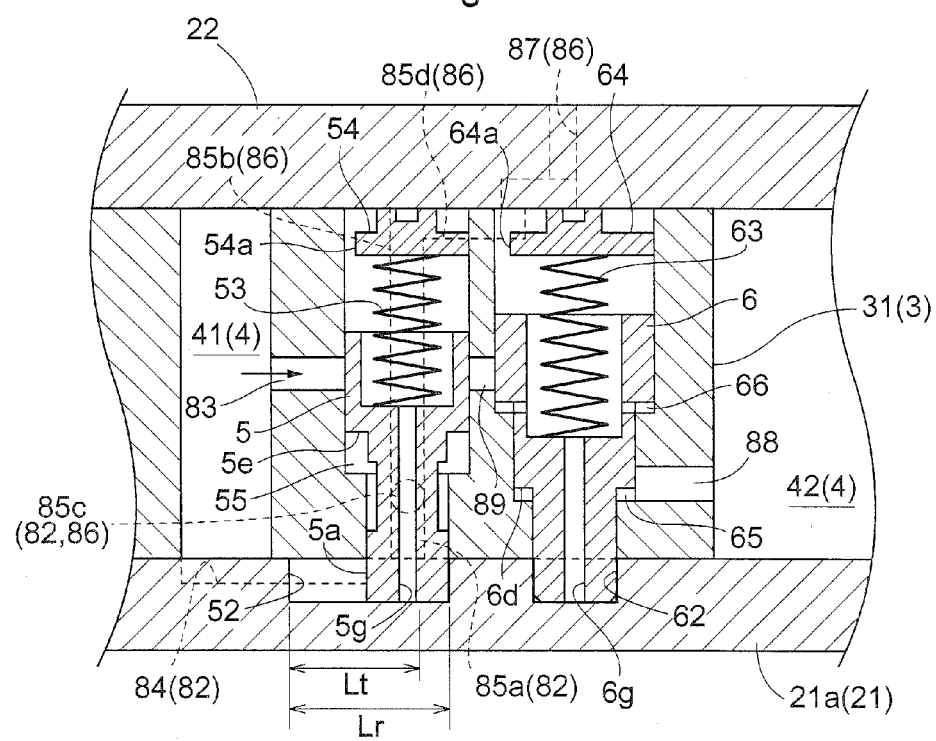
FIG. 5B is a cross-sectional view illustrating states of the restriction mechanism and the lock mechanism when an engine is started.

FIG. 5 illustrates a state occurring when the engine is started. When the engine is started, the hydraulic control valve 72 is at the first position 72a, and thus advance control is carried out. However, because the restriction member 5 is outside of the range of the restriction liftable range Lt, the working oil is not supplied to the first hydraulic chamber 55 from the restriction communication channel 82. In addition, because the lifting communication channel 83 also does not communicate with the first hydraulic chamber 55, the working oil is not supplied to the first hydraulic chamber 55. Accordingly, the locked state is maintained.

Figure 6A:
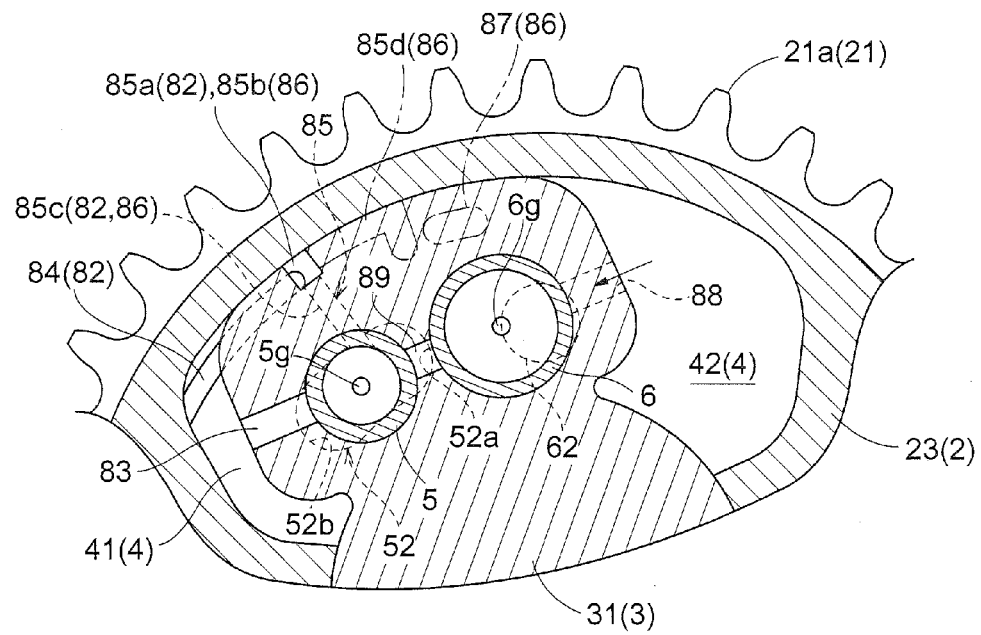
FIG. 6A is a plan view illustrating states of the restriction mechanism and the lock mechanism when a locked state is released.
Figure 6B:
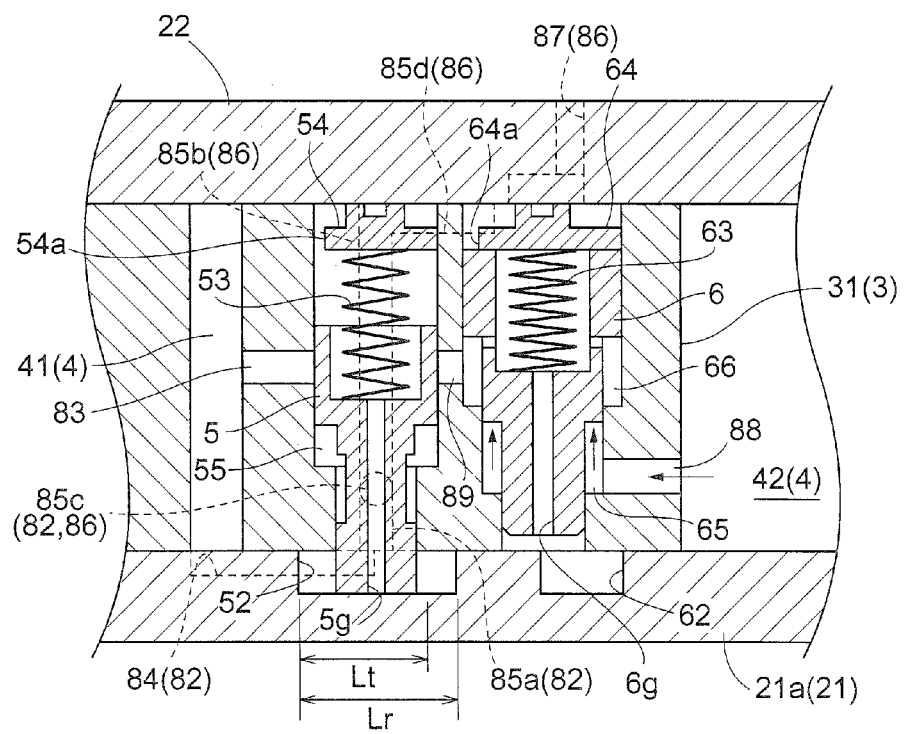
FIG. 6B is a cross-sectional view illustrating states of the restriction mechanism and the lock mechanism when a locked state is released.

FIG. 6 illustrates a state after the engine has started, when the control has first been switched to retard control in order to release the locked state. At this time, the working oil is supplied to the second hydraulic chamber 65 from the retard chamber 42 via the lock release flow path 88, the lock member 6 retracts from the locking recess 62, and the locked state is released. The restriction member 5 moves in the retard direction D2 within the restriction recess 52 when the locked state is released.

Figure 7A:
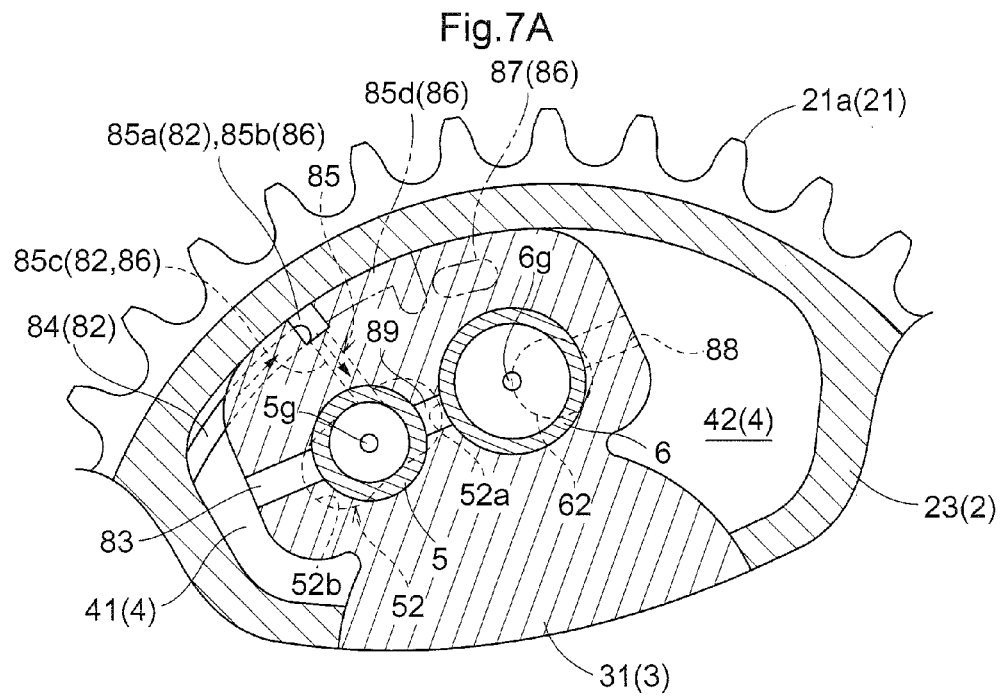
FIG. 7A is a plan view illustrating states of the restriction mechanism and the lock mechanism when a restricted state is lifted.
Figure 7B:
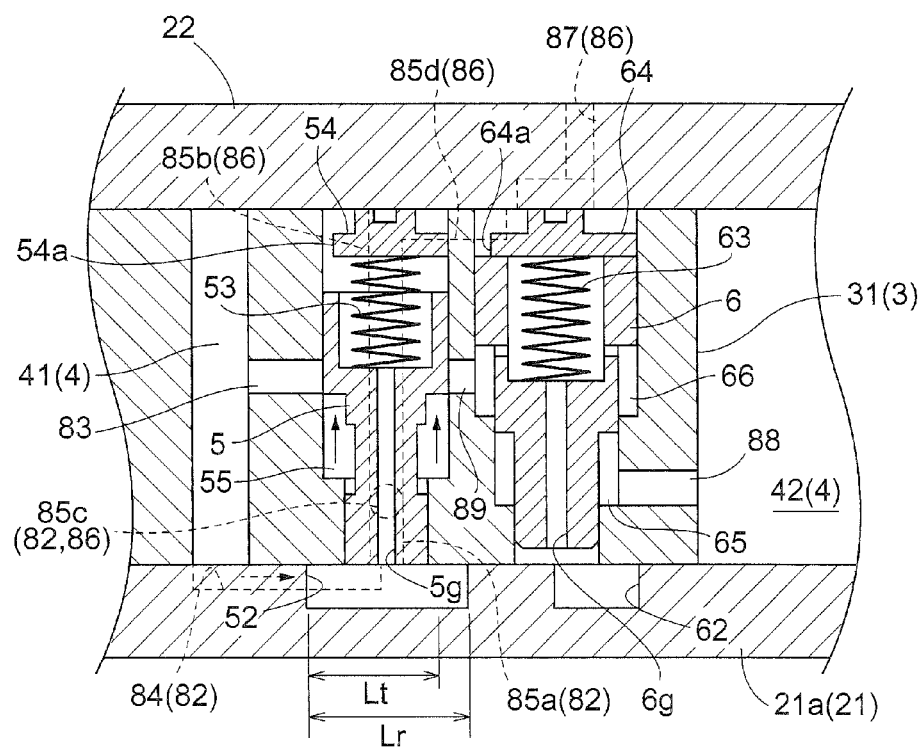
FIG. 7B is a cross-sectional view illustrating states of the restriction mechanism and the lock mechanism when a restricted state is lifted.

When a phase sensor, which is not shown, detects that a relative rotational phase in which the restriction member 5 is located within the range of the restriction liftable range Lt has been achieved, the engine ECU 11 switches to advance control. This state is shown in FIG. 7. The rear plate channel 84 and the first through-channel 85a communicate, and thus the working oil is supplied to the first hydraulic chamber 55 from the restriction communication channel 82. As a result, the restriction member 5 retracts from the restriction recess 52 and the restricted state is lifted.

Figure 8A:
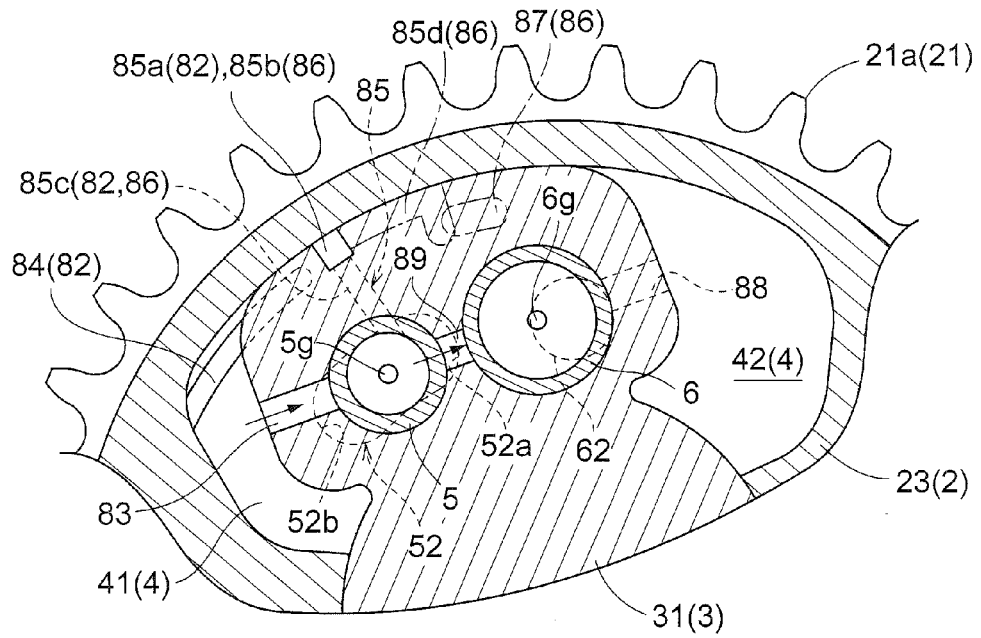
FIG. 8A is a plan view illustrating states of the restriction mechanism and the lock mechanism when holding a restriction-lifted state and a lock-released state.
Figure 8B:
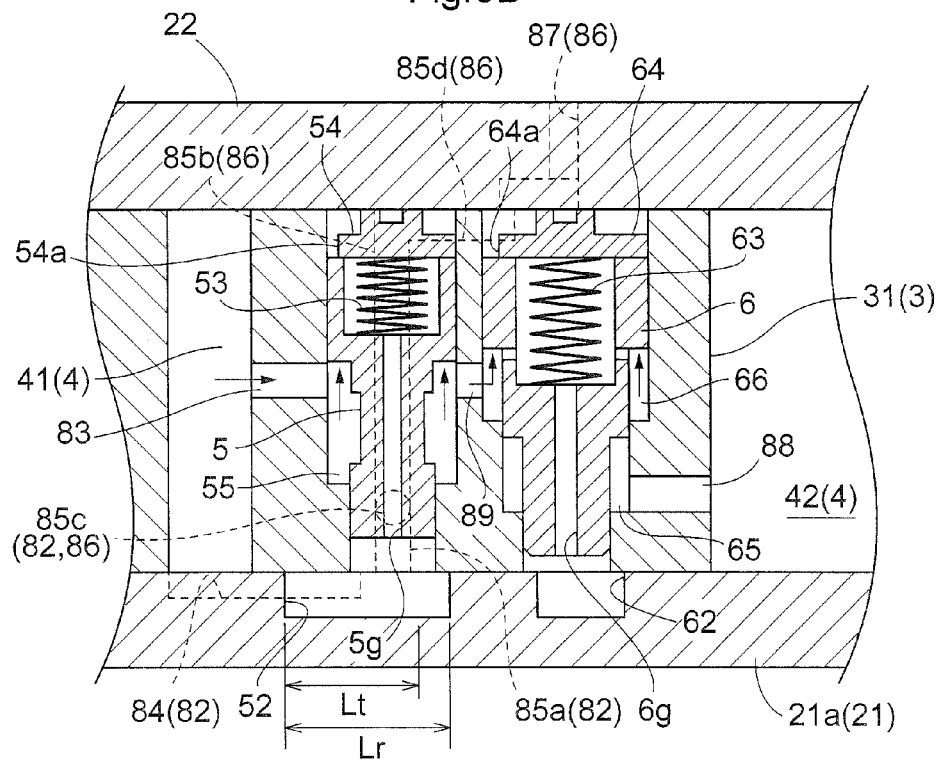
FIG. 8B is a cross-sectional view illustrating states of the restriction mechanism and the lock mechanism when holding the restriction-lifted state and the lock-released state.

FIG. 8 illustrates a state in which the restriction-lifted state and the lock-released state are held as a result of the advance control. At this time, the first hydraulic chamber 55 and the third hydraulic chamber 66 communicate via the communication flow path 89, and thus the working oil supplied to the first hydraulic chamber 55 from the advance chamber 41 is also supplied to the third hydraulic chamber 66. As a result, the restriction-lifted state and the lock-released state are held.

(Operations During Normal Driving State)

Next, operations performed in a normal driving state where the restriction-lifted state and the lock-released state are achieved through the aforementioned procedures will be described based on FIG. 9 and FIG. 10.

Figure 9A:
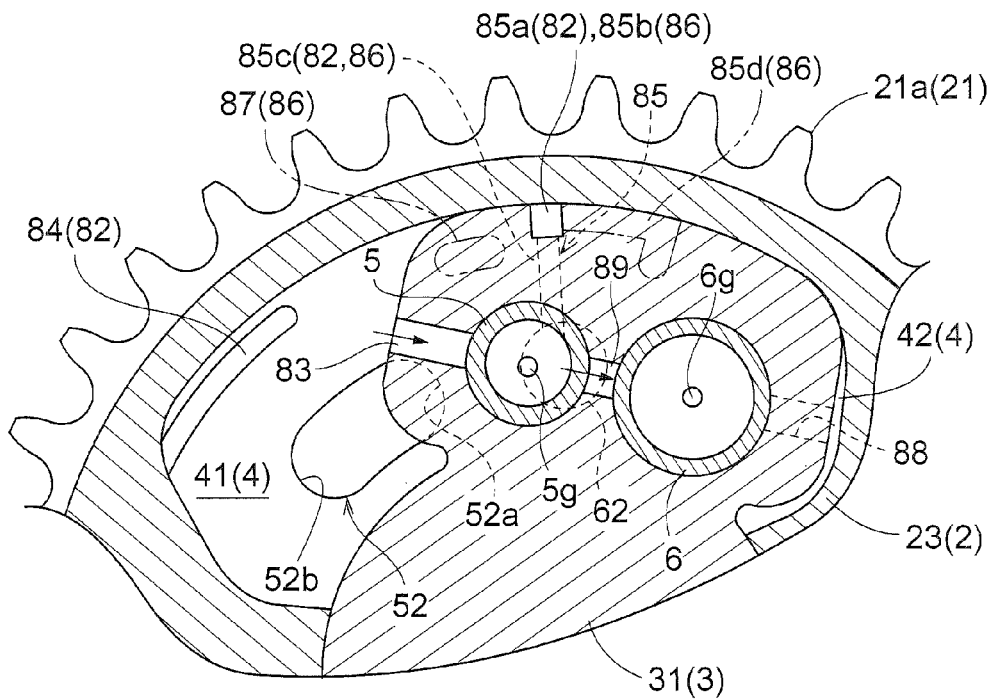
FIG. 9A is a plan view illustrating states of the restriction mechanism and the lock mechanism during advance control in a normal driving state.
Figure 9B:
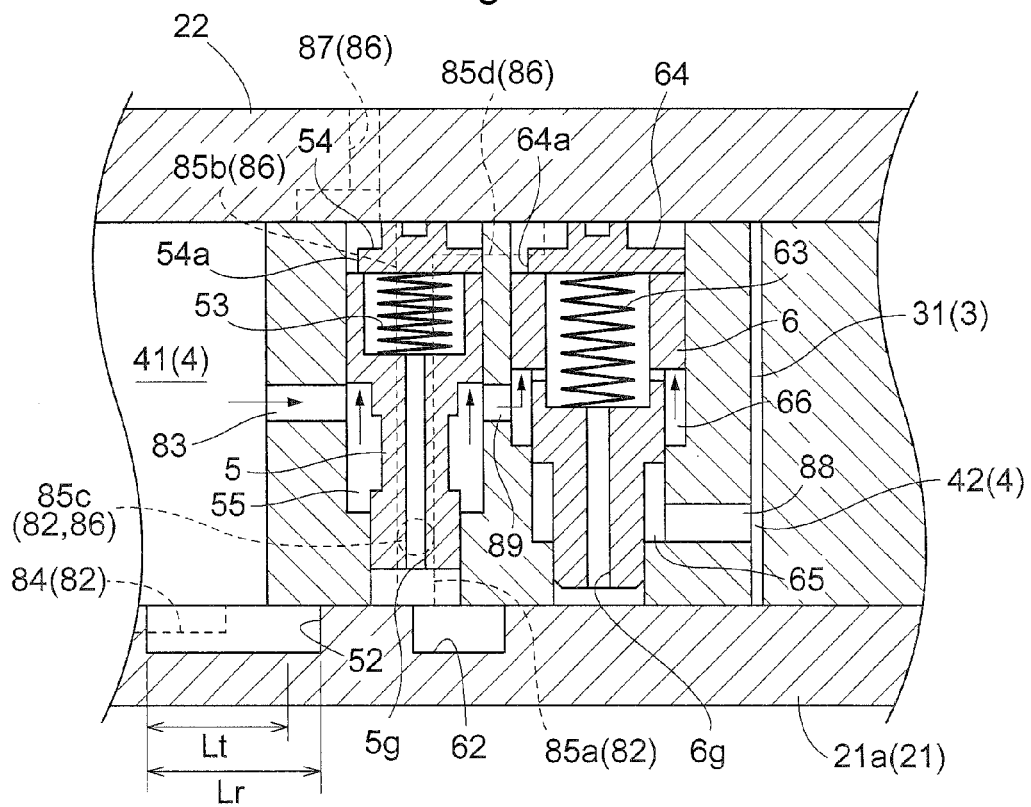
FIG. 9B is a cross-sectional view illustrating states of the restriction mechanism and the lock mechanism during advance control in a normal driving state.

FIG. 9 illustrates a state occurring when the advance control is carried out during the normal driving state. As described above, during the advance control, the advance chamber 41, the lifting communication channel 83, the first hydraulic chamber 55, the communication flow path 89, and the third hydraulic chamber 66 communicate, and thus the advance operation occurs in a state where the restriction-lifted state and the lock-released state are held.

FIG. 10 illustrates a state occurring when the retard control is carried out during the normal driving state. At this time, the working oil is supplied to the second hydraulic chamber 65 from the retard chamber 42, and thus the lock-released state is held. On the other hand, the working oil is not supplied to the first hydraulic chamber 55, and thus the restriction member 5 is biased by the spring 53 and makes contact with the rear plate 21. However, because the restriction member 5 slides along the surface of the rear plate 21, the driving is not interfered with. Furthermore, because the restriction recess 52 and the locking recess 62 are formed in positions that are shifted in the radial direction, the restriction member 5 does not enter into the locking recess 62.

(Operations During Restriction and Locking)

Finally, a procedure for entering the locked state after achieving the restricted state will be described based on FIG. 11 to FIG. 13.

Figure 11A:
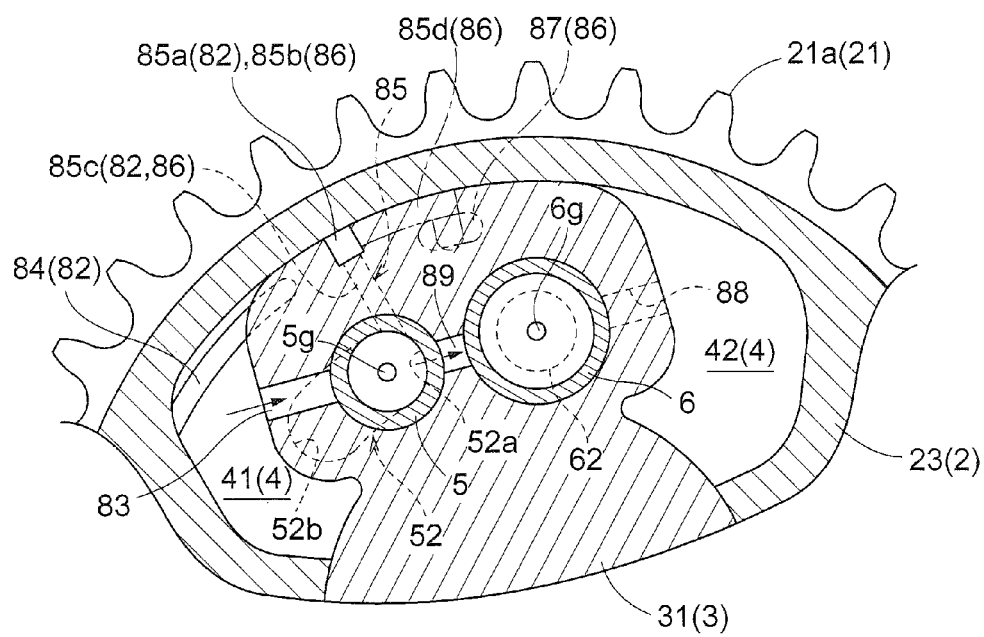
FIG. 11A is a plan view illustrating states of the restriction mechanism and the lock mechanism when starting a locking operation.
Figure 11B:
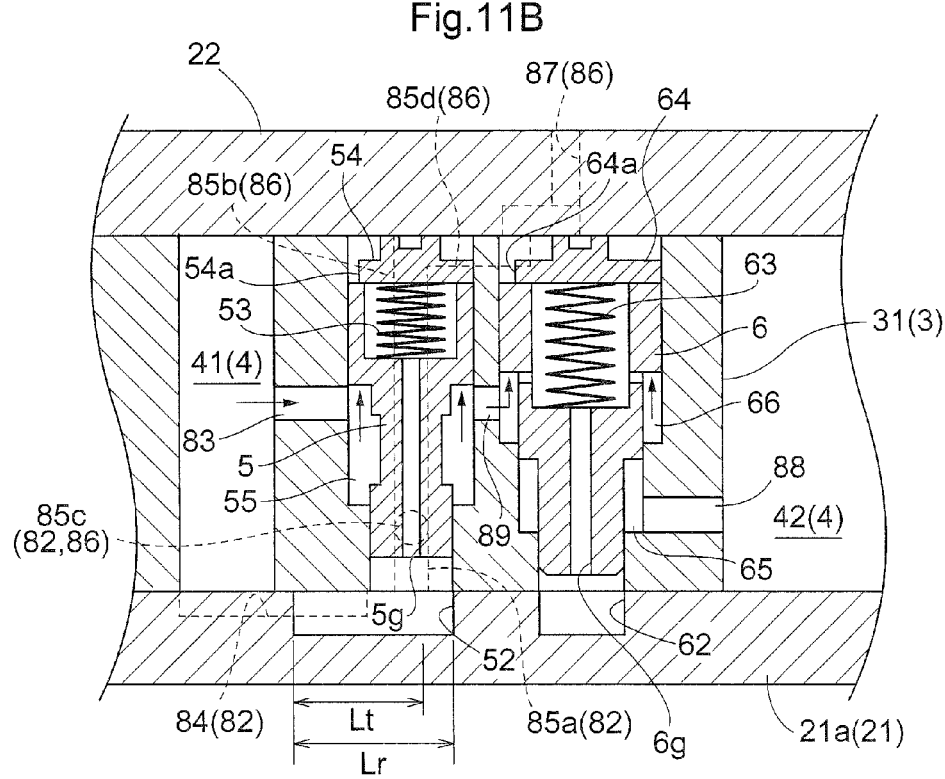
FIG. 11B is a cross-sectional view illustrating states of the restriction mechanism and the lock mechanism when starting a locking operation.

FIG. 11 illustrates a state in which the discharge path 85d and the discharge hole 87 communicate and the phase is rotated to a position where the drain flow path 86 functions, as a result of the advance control. At this time, the working oil is supplied to the first hydraulic chamber 55 and the third hydraulic chamber 66 from the advance chamber 41, and thus the restriction-lifted state and the lock-released state are held. Because the drain flow path 86 is communicating, the working oil can be discharged from the first hydraulic chamber 55 and the restricted state can be achieved quickly when the restriction member 5 is inserted into the restriction recess 52 according to the following procedure.

Figure 12A:
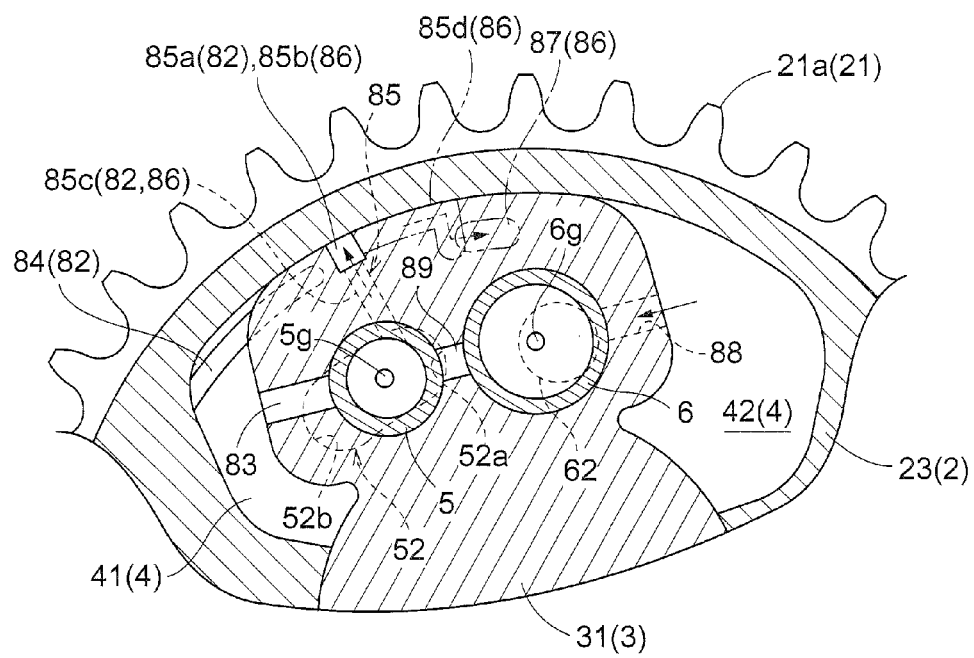
FIG. 12A is a plan view illustrating states of the restriction mechanism and the lock mechanism when setting the restricted state.
Figure 12B:
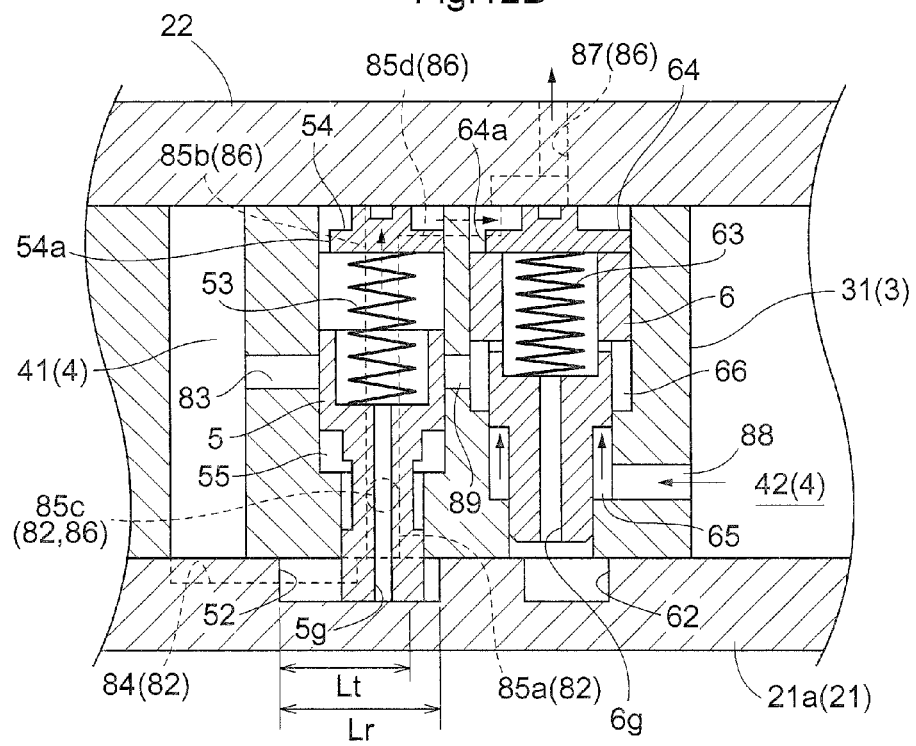
FIG. 12B is a cross-sectional view illustrating states of the restriction mechanism and the lock mechanism when setting the restricted state.
Figure 13A:
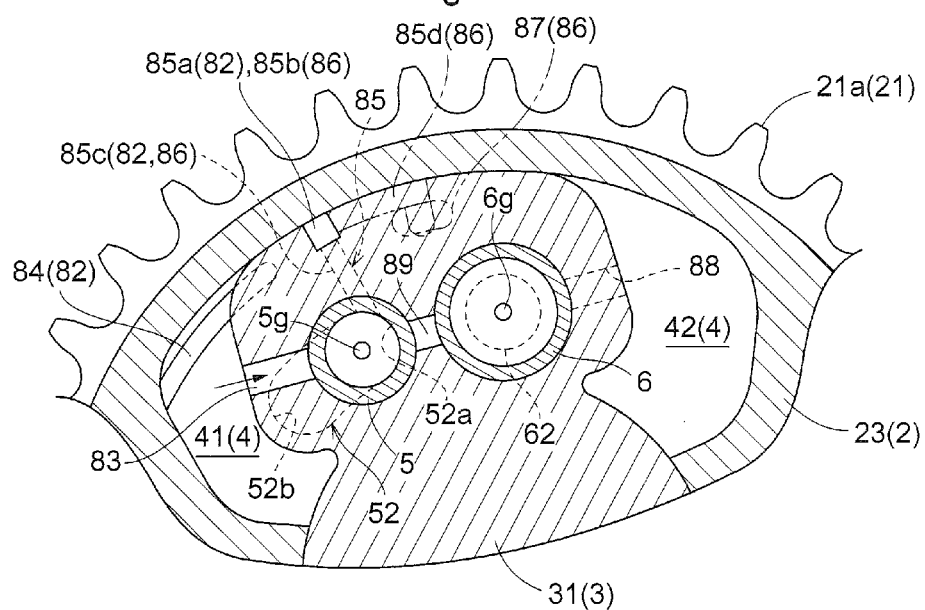
FIG. 13A is a plan view illustrating states of the restriction mechanism and the lock mechanism during a locked state.
Figure 13B:
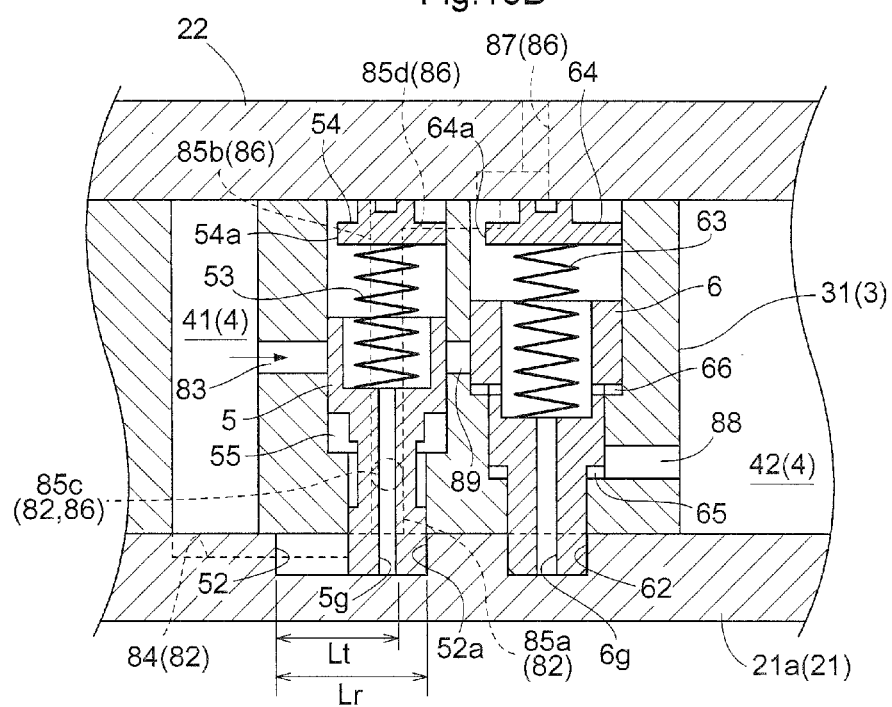
FIG. 13B is a cross-sectional view illustrating states of the restriction mechanism and the lock mechanism during a locked state.

FIG. 12 illustrates a state in which the control is switched to the retard control and the restricted state is achieved. If the retard control is maintained even after the restriction member 5 is inserted into the restriction recess 52, the restriction member 5 will be located within the restriction liftable range Lt, and the restricted state will be lifted the next time the control is switched to the advance control. Accordingly, after the restricted state has been achieved, it is necessary to switch to advance control before the restriction member 5 is located within the range of the restriction liftable range Lt and the rear plate channel 84 and the first through-channel 85a communicate with each other.

If the control is switched to the advance control before the restriction member 5 enters the restriction liftable range Lt, the working oil will not be supplied to the first hydraulic chamber 55, and thus the advance operation will be carried out without the restriction member 5 being retracted from the restriction recess 52. As a result, the restriction member 5 makes contact with the first end portion 52a of the restriction recess 52. At this time, the supply of the working oil to the communication flow path 89 is cut off; accordingly, the lock member 6 is biased by the spring 63, enters into the locking recess 62, and the locked state illustrated in FIG. 13 is achieved.

Figure 14:
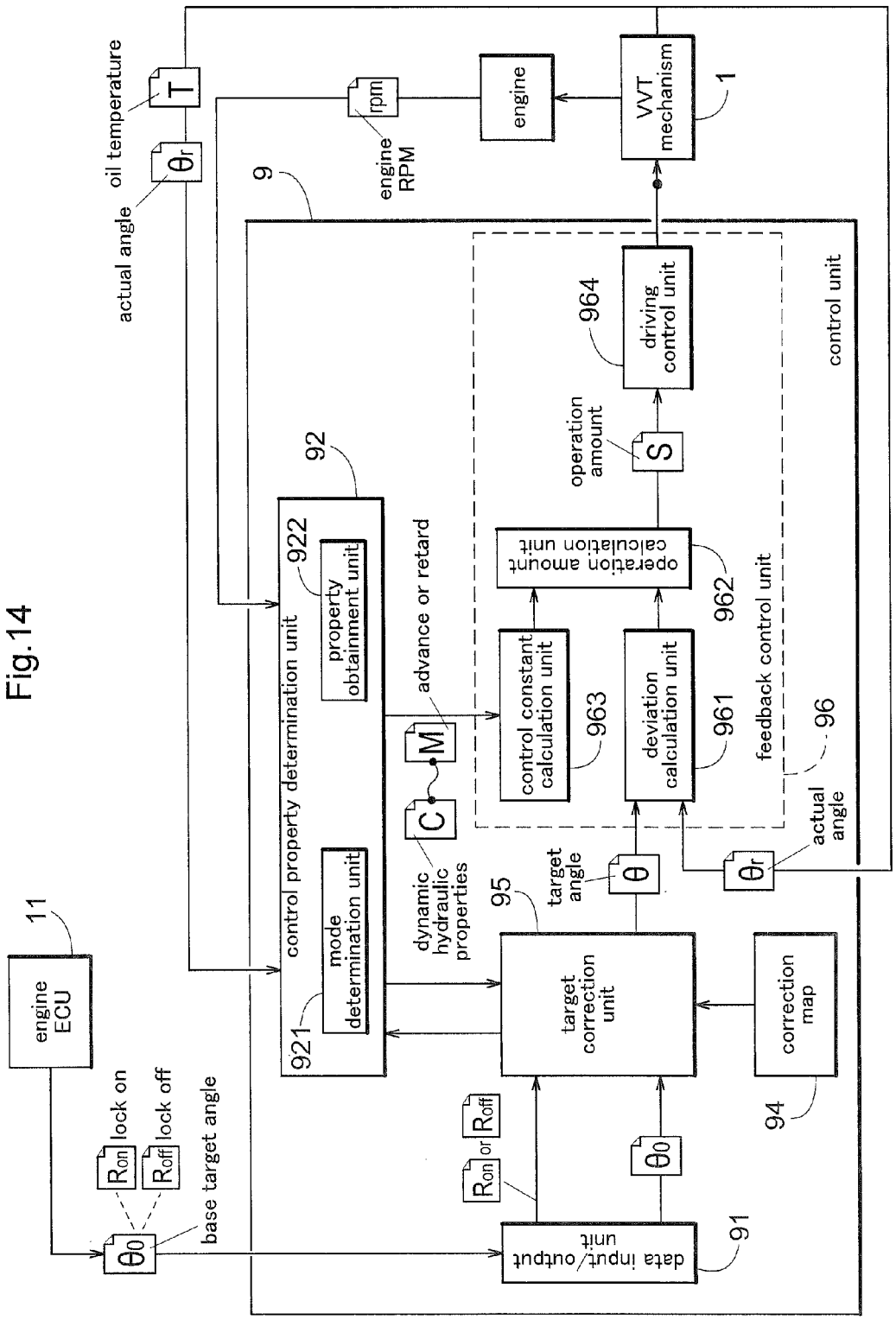
FIG. 14 is a functional block diagram illustrating functions of a control unit.

The control unit 9, which controls the displacement mechanism unit and the locking mechanism unit 60 of the VVT mechanism 1 configured as described above based on operational instructions from the engine ECU 11, will be described using the functional block diagram in FIG. 14. In this embodiment, it is assumed that the operational instructions from the engine ECU 11 include a base target angle (rotational phase) and on/off information for the locking operation or the lock release operation at that operational stage. The on/off information for the locking operation or the lock release operation may be determined by the control unit 9 based on the base target angle.

The control unit 9 includes a data input/output unit 91, a control property determination unit 92, a correction map 94, a target correction unit 95, and a feedback control unit 96. The data input/output unit 91 receives the base target angle sent from the engine ECU 11 and other data from the ECU and the like, which is not shown, and transfers the data to the various functional units in the control unit 9 that request the data. On/off information: Ron, Roff for the locking operation or the lock release operation is read from the base target angle: θ0 from the engine ECU 11, and the base target angle: θ0 itself is transferred to the target correction unit 95.

The control property determination unit 92 has a function for changing the temporal responsiveness in the feedback control unit 96 in accordance with a vehicle state. Detected data such as the base target angle, the engine RPM corresponding to the RPM of the hydraulic pump 71 (indicated by rpm in FIG. 14), the oil temperature in the hydraulic pathway 7 (indicated by T in FIG. 14), the actual angle corresponding to the actual rotational phase of the VVT mechanism 1 (indicated by θr in FIG. 14), and so on are inputted into the control property determination unit 92. The control property determination unit 92 includes a mode determination unit 921 and a property obtainment unit 922.

The mode determination unit 921 determines whether the rotational phase displacement control to be carried out henceforth is control resulting in displacement in the retard direction D2 (the retard control mode) or control resulting in displacement in the advance direction D1 (the advance control mode). Mode type information, which corresponds to a result of the determination (indicated by M in FIG. 14; the details thereof indicate advance or retard), is supplied to the target correction unit 95, the feedback control unit 96, and so on.

The property obtainment unit 922 obtains the property information regarding the dynamic hydraulic properties of the hydraulic pathway 7. In particular, the dynamic hydraulic properties are properties of the working oil related to the responsiveness of the hydraulic control valve 72, and the oil viscosity, oil pressure, and so on typically play a large role. Because the oil viscosity is dependent on the oil temperature, the oil temperature is used here instead of measuring the oil viscosity. Furthermore, the engine RPM is used instead of measuring the oil pressure. In other words, in this embodiment, the oil temperature and the engine RPM are inputted as the property information indicating the dynamic hydraulic properties. The parameters themselves that configure this property information, or property parameters calculated therefrom, are supplied to the target correction unit 95, the feedback control unit 96, and so on as the dynamic hydraulic properties (indicated by C in FIG. 14).

Using the correction map 94 that takes the base target angle and the on/off information for the locking operation or the lock release operation received from the data input/output unit 91 as input parameters, the target correction unit 95 derives the target angle (indicated by θ in FIG. 14) for implementing an optimal control amount for the driving state, the vehicle properties, and so on, and outputs the target angle to the feedback control unit 96. At this time, dynamic hydraulic properties, the mode type information (the advance control mode or the retard control mode), and so on are read out from the control property determination unit 92 and used in the calculation of the target angle as necessary.

The feedback control unit 96 includes a deviation calculation unit 961, an operation amount calculation unit 962, a control constant calculation unit 963, and a drive control unit 964. The deviation calculation unit 961 calculates a deviation based on a difference between the target angle sent from the target correction unit 95 and the actual angle serving as a control amount. The operation amount calculation unit 962 functions as a controller that takes the deviation as an input and outputs an operation amount (indicated by S in FIG. 14), and is typically configured as a PID controller, although another type of controller may be employed as well. The control constant calculation unit 963 sets the temporal responsiveness in the operation amount calculation unit 962, and in this embodiment, sets the time constant of the feedback control unit 96. Basically, the details of the mode type information sent from the control property determination unit 92 (the advance control mode or the retard control mode) are used in the calculation of this time constant. In the case of the advance control mode, the time constant is reduced and the temporal responsiveness of the control is increased, whereas in the case of the retard control mode, the time constant is increased and the temporal responsiveness of the control is reduced. Furthermore, based on the dynamic hydraulic properties sent from the control property determination unit 92, the time constant is reduced in order to adjust a drop in the temporal responsiveness if the dynamic hydraulic properties will cause such a drop, and the time constant is increased in order to adjust excessiveness in the temporal responsiveness if the dynamic hydraulic properties will increase the temporal responsiveness. Based on the operation amount outputted from the operation amount calculation unit 962, the drive control unit 964 generates and outputs a driving signal (a PWM signal, in this embodiment) that drives the solenoid of the hydraulic control valve 72 in the VVT mechanism 1.

Figure 15:
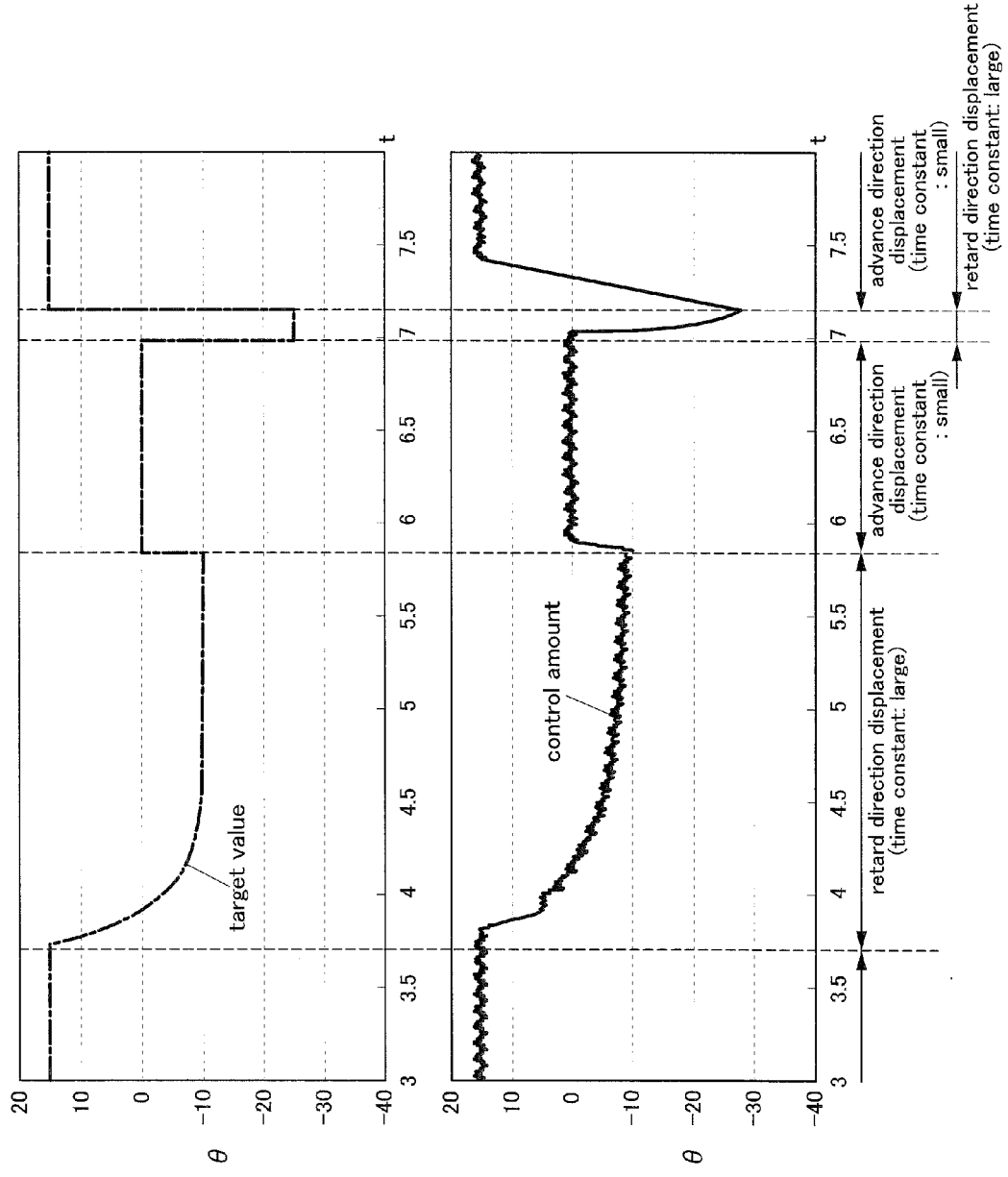
FIG. 15 is a schematic diagram illustrating an example of a relationship between a target value and a control amount in the valve timing adjustment system according to the first embodiment.

An important characteristic of the control of the VVT mechanism 1 by the control unit 9 is that the temporal responsiveness of the feedback control unit 96 is changed based on the direction of the rotational phase displacement in the VVT mechanism 1. To illustrate this schematically, FIG. 15 shows an example of a graph indicating the behavior of the target value (the target angle) (the upper section of FIG. 15) and a graph indicating the behavior of the control amount (the actual angle) (the lower section of FIG. 15), with the vertical axes representing the rotational phase and the horizontal axes representing the passage of time. While the target value graph is moving downward, the displacement is in the retard direction D2, and thus feedback control is executed in the retard control mode so as to increase the time constant beyond a standard value. Conversely, while the target value graph is moving upward, the displacement is in the advance direction D1, and thus feedback control is executed in the advance control mode so as to increase the time constant beyond the standard value. The state of feedback control in the two different control modes can be understood from the two graphs shown in FIG. 15.

Figure 16:
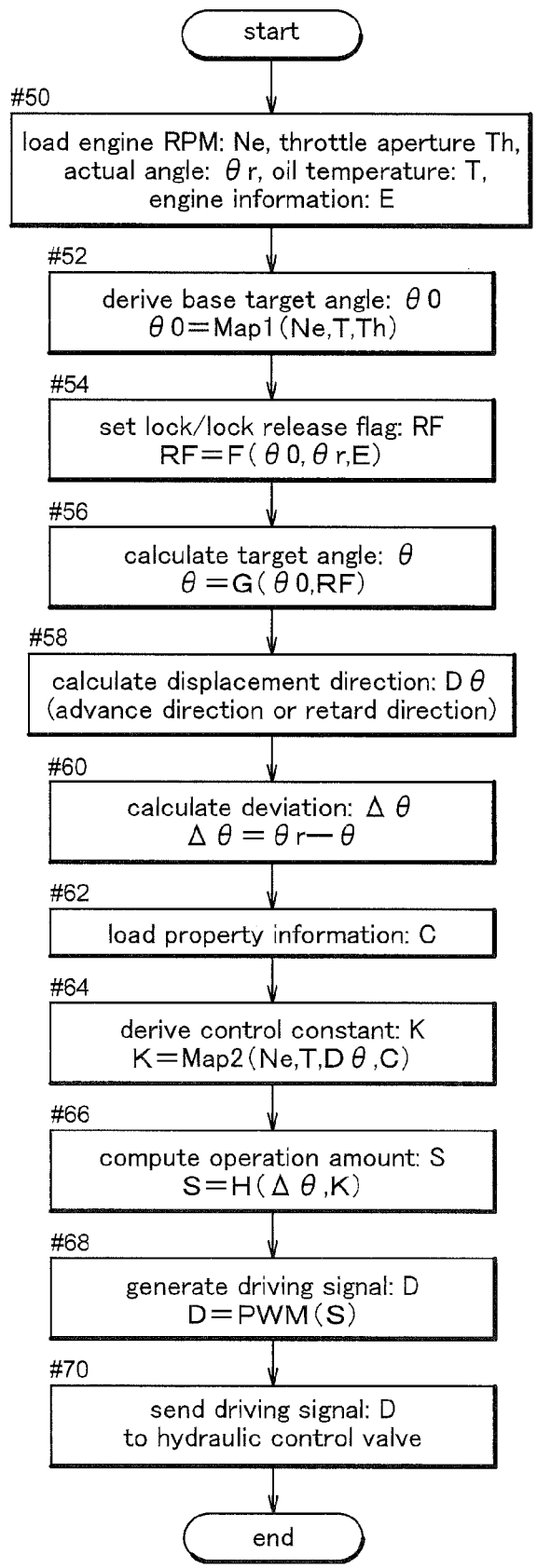
FIG. 16 is a flowchart illustrating an example of a rotational phase control routine for a VVT mechanism.

A rotational phase control routine for the VVT mechanism 1 embodying the valve timing adjustment system according to the present invention configured as described thus far will be described using the flowchart in FIG. 16.

First, the engine RPM: Ne, a throttle aperture: Th, the actual angle: θr, the oil temperature: T, and engine information: E are loaded as input parameters for the control system (#50). The engine information: E includes data indicating various driving states, such as engine startup, engine shutdown, no idling, and so on. The base target angle: θ0, serving as the rotational phase of the VVT mechanism 1 that in turn serves as the required valve timing, is derived from the loaded input parameters (#52). A pre-set map: Map(Ne, T, Th) is used to derive the base target angle: θ0.

$$\theta 0 = Map(Ne, T, Th)$$

The base target angle: θ0 may be derived by the engine ECU 11 and transferred to the control unit 9, or may be derived by the control unit 9.

Setting of a lock/lock release flag: RF expressing a locking operation or a lock release operation of the lock member 6 in the locking mechanism unit 60 is determined based on the base target angle: θ0, the actual angle: θr, and the engine information: E, using a determination function: F (#54).

$$RF = F(\theta 0, \theta r, E)$$

Next, the target correction unit 95 calculates the target angle: θ using a target angle derivation function or a map: G (#56).

$$θ=G(θ0,RF)$$

At the same time, the mode determination unit 921 calculates whether a direction: Dθ of the rotational phase displacement is the advance direction D1 or the retard direction D2, and sets a result of the calculation in Dθ, which also serves as a flag variable (#58).

The deviation calculation unit 961 then calculates a difference between the target angle: θ and the actual angle: θr as a deviation: Δθ (#60).

$$Δθ=θr-θ$$

Furthermore, the control constant calculation unit 963 loads property information: C, the rotational phase displacement direction: Dθ, and the like (#62), and derives a control constant (here, the time constant): K using a map: Map2 that takes any of the engine RPM: Ne, the oil temperature: T, the rotational phase displacement direction: Dθ, and the property information: C as input parameters (#64).

$$K=\mathrm{Map2}(Ne,T,Dθ,C)$$

An operation amount: S is then computed through the operation amount calculation unit 962 that has been re-set according to the newly-derived control constant: K (#66).

$$S=H(Δθ,K)$$

A driving signal: D, which is a PWM signal, is generated by the drive control unit 964 using the computed and outputted operation amount: S (#68).

$$D=PWM(S)$$

The generated driving signal: D is sent to the hydraulic control valve 72, based on which the displacement mechanism unit and the locking mechanism unit 60 of the VVT mechanism 1 are controlled.

Figure 17:
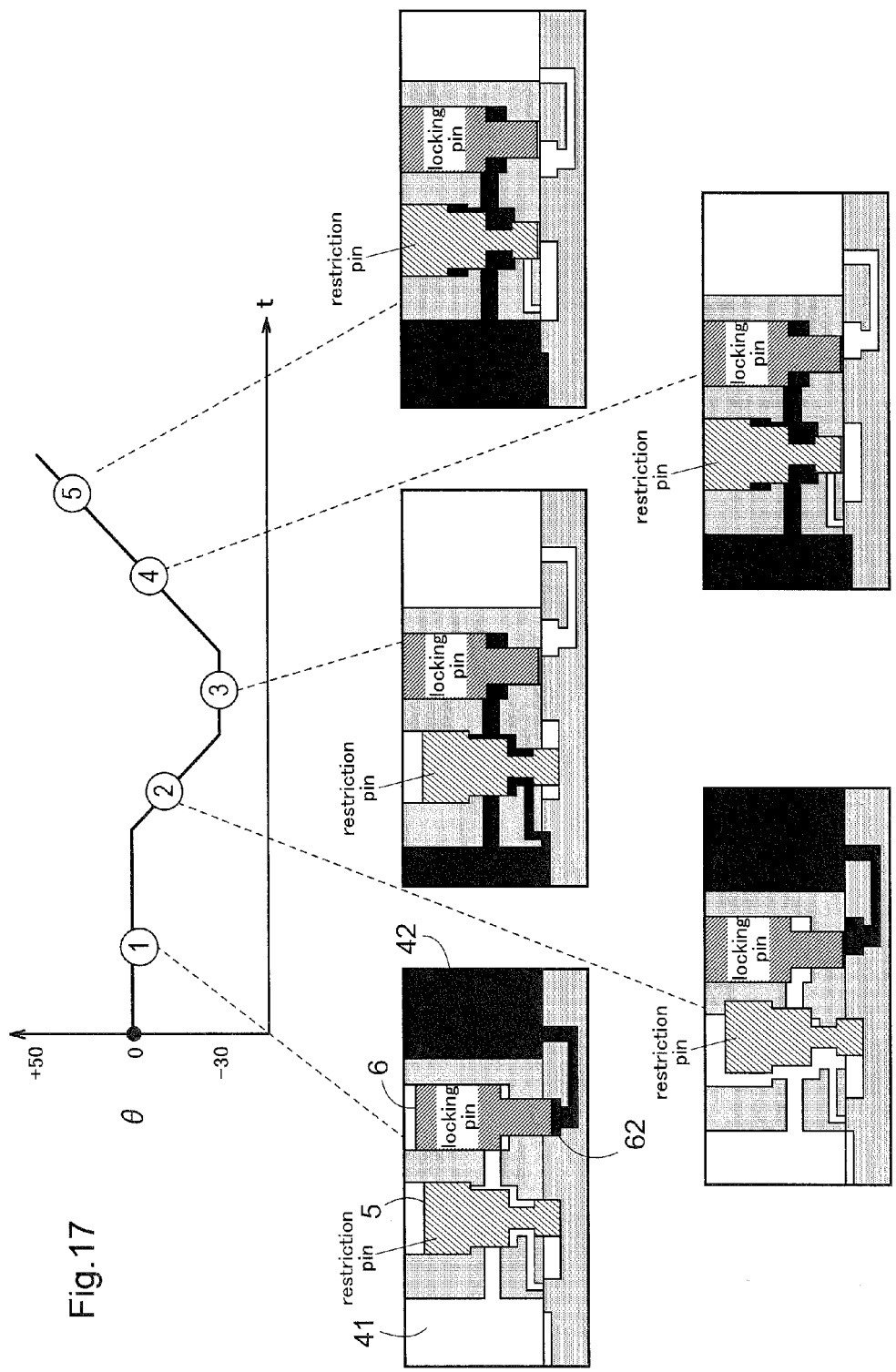
FIG. 17 is a schematic diagram illustrating a rotational phase displacement process from startup to lock release.

A process for specifying the rotational phase displacement is realized by repeating this rotational phase control routine, and an example of this process (from startup to lock release) will be described using the schematic diagram in FIG. 17. Although not shown, the starting point of this process corresponds to a driving stopped state, where the restriction member 5 and the lock member 6 are inserted into the restriction recess 52 and the locking recess 62, respectively.

Step (1)

Although not shown, at startup, oil pressure is first applied to the advance chamber 41, after which the working oil is supplied to the retard chamber 42 for retard control. At this time, the working oil supplied to the retard chamber 42 advances into the locking recess 62 and pushes the lock member 6 upward.

Step (2)

When the lock member 6 is lifted from the locking recess 62, the rotational phase displaces in the retard direction D2 under the oil pressure on the retard chamber 42.

Step (3)

When the rotational phase displaces to a predetermined phase, the supply of the working oil to the retard chamber 42 is stopped, and the working oil is then supplied to the advance chamber 41 for advance control. The working oil supplied to the advance chamber 41 is used to lift the restriction member 5 from the restriction recess 52 and to hold the lock member 6 up (that is, release the lock).

Step (4)

When the restriction member 5 is lifted from the restriction recess 52, the rotational phase displaces in the advance direction D1 under the oil pressure on the advance chamber 41.

Step (5)

Furthermore, because the lock member 6 is held up (that is, the lock is released), the displacement of the rotational phase in the advance direction D1 passes beyond the locked position. As a result, the displacement continues to an advance position suited for acceleration.

Second Embodiment

Before describing a second embodiment of a valve timing adjustment system according to the present invention, an overall description of the invention will be given using the schematic diagram in FIG. 18. In the following descriptions of the present embodiment, areas having the same configurations as those in the first embodiment will be assigned the same reference signs, and descriptions of the same configurations will be omitted. This system includes the VVT mechanism 1 that is controlled by a control unit 90. Although specific descriptions will be given later, the VVT mechanism 1 includes the displacement mechanism unit that displaces the rotational phase of the camshaft 19 relative to the crankshaft 18 of the engine E in the advance direction D1 or the retard direction D2, and the locking mechanism unit 60 (not shown in FIG. 18) that locks the rotational phase at an intermediate locked phase positioned within a displacement range of the rotational phase. The displacement mechanism unit and the locking mechanism unit 60 are operated by the hydraulic control valve 72 (not shown in FIG. 18) whose driving is controlled by a driving signal (for example, a PWM signal). The control unit 90 configures a feedback control system that outputs the driving signal to the hydraulic control valve 72 based on a base target rotational phase (indicated by θ0 in FIG. 18) that serves as a rotational phase control target provided by the engine ECU 11.

The temporal responsiveness of the movement of the spool of the hydraulic control valve 72 and of the movement of the displacement mechanism unit and the locking mechanism unit 60 (the rotational phase, the locking operation, and the lock release operation) caused by the pressure of the oil supplied from the hydraulic control valve 72 vary depending on the dynamic hydraulic properties of the working oil used in the hydraulic pathway 7 including the hydraulic control valve 72 that controls the hydraulic operations of the VVT mechanism 1. Degradation of the working oil is one factor that affects the dynamic hydraulic properties.

Accordingly, in this invention, the control unit 90 changes the temporal responsiveness of the control system based on a result of evaluating the degree of degradation of the working oil used in the hydraulic pathway 7 including the hydraulic control valve 72 that controls the hydraulic operations of the VVT mechanism 1. This compensates for a drop in the dynamic hydraulic properties caused by the oil degradation and a resulting drop in the temporal responsiveness of the overall control system, including hydraulic control. To realize such compensation, a temporal responsiveness that can compensate for the dropping temporal responsiveness is selected based on the degree of degradation, and a control coefficient (indicated by K in FIG. 18) that defines a temporal responsiveness of the feedback control system, such as a time constant, is changed based on the selected temporal responsiveness.

Figure 18:
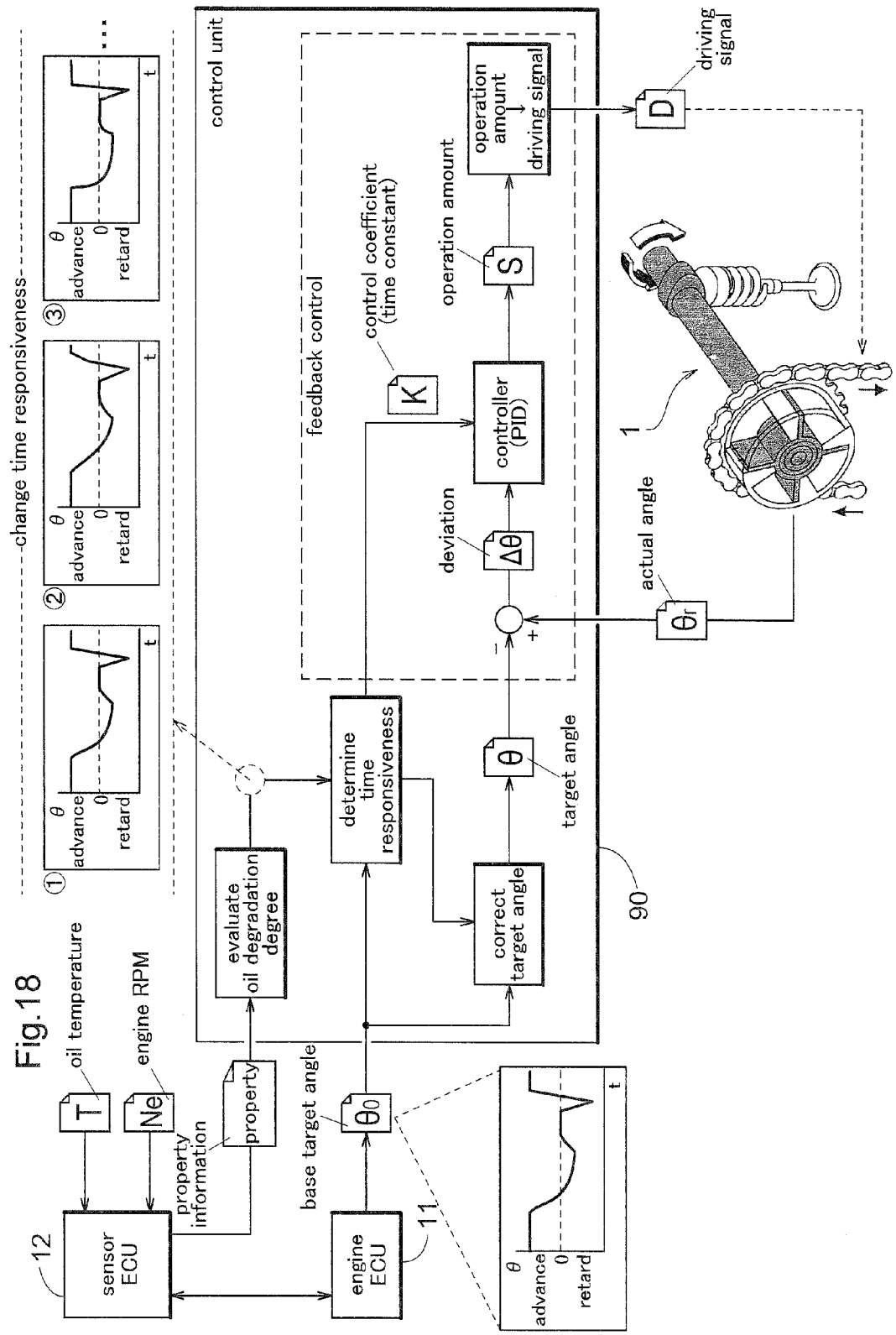
FIG. 18 is a schematic diagram illustrating the overall flow of basic control performed by a valve timing adjustment system according to a second embodiment.

The distance a vehicle has traveled or the amount of time that has passed since an oil change are factors in the oil degradation that affects the dynamic hydraulic properties, and thus such information is obtained as property information (indicated by "property" in FIG. 18) from a sensor ECU 12 in FIG. 18. Meanwhile, in the case where the oil temperature (indicated by T in FIG. 18), the engine RPM, and so on are also considered as factors affecting the dynamic hydraulic properties aside from the oil degradation, values thereof are also included in the property information and are used as factors when changing the temporal responsiveness. The engine RPM is continuously detected for engine control, and the RPM of the hydraulic pump 71, which is related to the engine RPM, is also related to the oil pressure, thus has value as the property information. In the case where the oil pressure is detected by an oil pressure sensor or the like, the oil pressure (an example of a displacement force) can be used instead of the engine RPM: Ne. In addition to the oil pressure, fluctuations in cam torque (an example of a displacement force) acting on the inner rotor 3 through the camshaft 19 can also be used as the property information for changing the temporal responsiveness.

As an option, the base target angle (indicated by θ0 in FIG. 18) is also corrected based on the temporal responsiveness determined based on the property information, as indicated in the schematic diagram of the invention in FIG. 18. The corrected base target angle then becomes a target angle (indicated by θ in FIG. 18) to serve as a target value for feedback control.

Note that when determining the temporal responsiveness based on the property information as described above, it is favorable to create a map in advance for selecting from various temporal responsiveness prepared in advance as illustrated schematically in FIG. 18, based on the property information that serves as input parameters.

A feedback system itself has a well-known configuration, and the operation amount: S is computed based on a deviation (indicated by Δθ in FIG. 18) as a difference between the actual angle (indicated by θr in FIG. 18) corresponding to a measured value of the rotational phase in the VVT mechanism 1 (an actual value of the rotational phase) and the target angle: θ corresponding to a target value of the rotational phase. Furthermore, the driving signal: D is generated from the computed operation amount and is outputted to the hydraulic control valve 72.

The configuration of the VVT mechanism 1 is the same as that in the first embodiment, illustrated in FIG. 2 to FIG. 13, and thus detailed descriptions thereof will be omitted.

Figure 19:
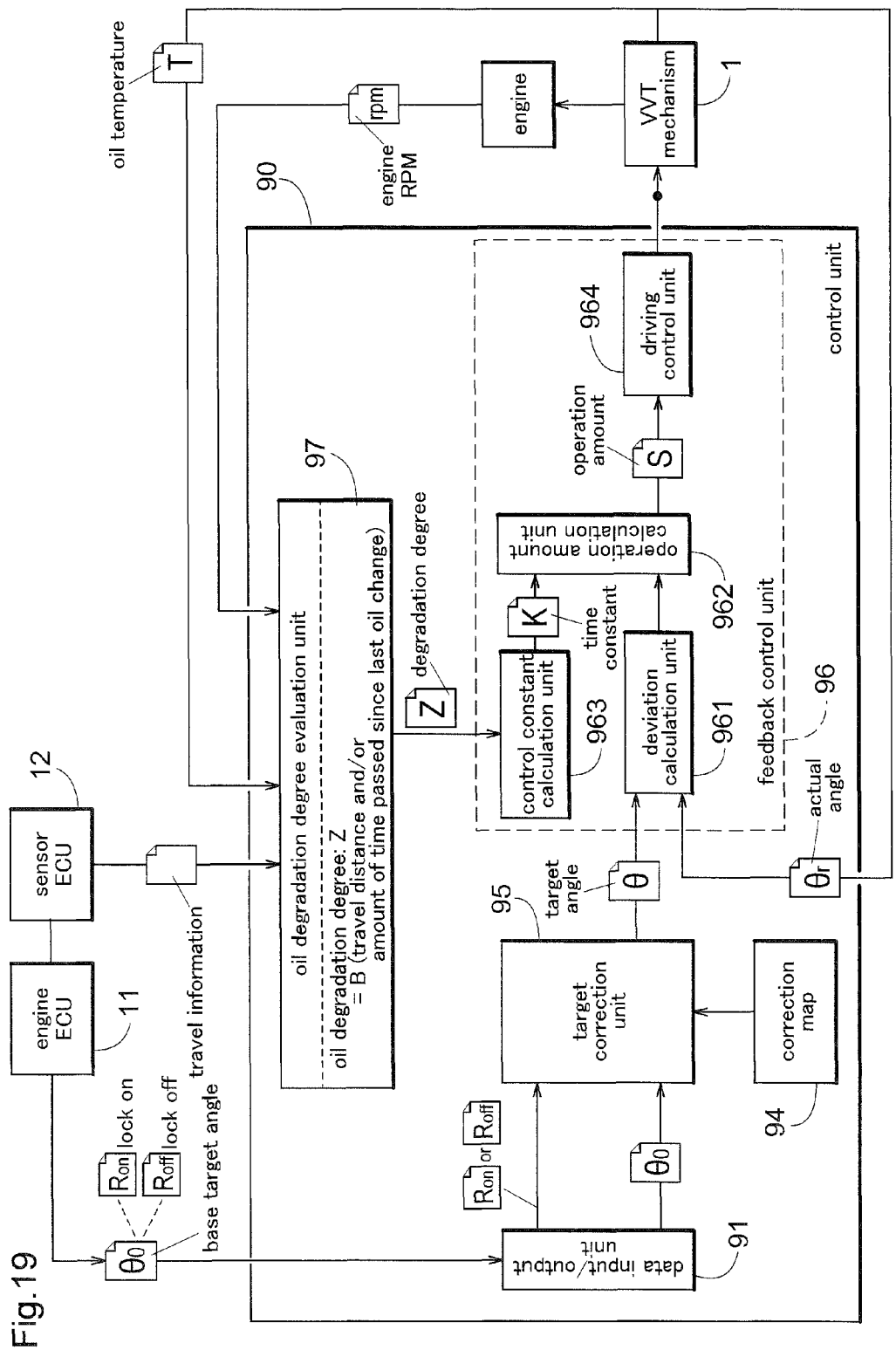
FIG. 19 is a functional block diagram illustrating functions of a control unit.

The control unit 90, which controls the displacement mechanism unit and the locking mechanism unit 60 of the VVT mechanism 1 based on operational instructions from the engine ECU 11, will be described using the functional block diagram in FIG. 19. In this embodiment, it is assumed that the operational instructions from the engine ECU 11 include a base target angle: θ0 serving as the base target rotational phase and on/off information for the locking operation or the lock release operation at that operational stage (indicated by Ron or Roff in FIG. 19). The on/off information for the locking operation or the lock release operation may be determined by the control unit 90 based on the base target angle.

The control unit 90 includes the data input/output unit 91, an oil degradation degree evaluation unit 97, the correction map 94, the target correction unit 95, and the feedback control unit 96. The data input/output unit 91 receives the base target angle: θ0 sent from the engine ECU 11 and other data from the ECU and the like, which is not shown, and transfers the data to the various functional units in the control unit 90 that request the data. The on/off information: Ron, Roff for the locking operation or the lock release operation is read from the base target angle: θ0 from the engine ECU 11, and the base target angle: θ0 itself is transferred to the target correction unit 95.

The oil degradation degree evaluation unit 97 has a function for deriving a degree of degradation of the oil based on a travel distance, an amount of time since the last oil change, or both thereof. In other words, the degree of degradation (indicated by Z in FIG. 19) is derived using the following function or a map.

$Z=B$(travel distance and/or amount of time since the last oil change)

The travel distance or the amount of time since the last oil change can be received from the sensor ECU 12 as travel information, but in this embodiment, the configuration is such that only the travel distance is received as travel information, and the degree of degradation is calculated based on a degree of degradation-travel distance curve.

Note that the dynamic hydraulic properties of the hydraulic pathway 7 that affect the temporal responsiveness of the control system are also affected by the oil viscosity, the oil pressure, and so on. Accordingly, it is favorable for the oil degradation degree evaluation unit 97 to have a function for outputting additional instructions for changing the temporal responsiveness based on information regarding the oil viscosity, the oil pressure, and so on. Here, because the oil viscosity is dependent on the oil temperature, it is possible to use the oil temperature instead of measuring the oil viscosity, and to use the engine RPM, which is linked to the RPM of the hydraulic pump 71 that is in turn related to the oil pressure, instead of measuring the oil pressure. These additional instructions can be supplied to the feedback control unit 96 along with the degree of degradation.

Using the correction map 94 that takes the base target angle and the on/off information for the locking operation or the lock release operation received from the data input/output unit 91 as input parameters, the target correction unit 95 derives the target angle (indicated by θ in the drawing) for implementing an optimal control amount for the driving state, the vehicle properties, and so on, and outputs the target angle to the feedback control unit 96.

The feedback control unit 96 includes the deviation calculation unit 961, the operation amount calculation unit 962, the control constant calculation unit 963, and the drive control unit 964. The deviation calculation unit 961 calculates a deviation based on a difference between the target angle sent from the target correction unit 95 and the actual angle serving as a control amount. The operation amount calculation unit 962 functions as a controller that takes the deviation as an input and outputs an operation amount (indicated by S in FIG. 19), and is typically configured as a PID controller, although another type of controller may be employed as well. The control constant calculation unit 963 sets the temporal responsiveness in the operation amount calculation unit 962, and in this embodiment, sets the time constant of the feedback control unit 96. In calculating the time constant, a suitable time constant is derived based on the degree of degradation supplied from the oil degradation degree evaluation unit 97. Based on the operation amount outputted from the operation amount calculation unit 962, the drive control unit 964 generates and outputs a driving signal (a PWM signal, in this embodiment) that drives the solenoid of the hydraulic control valve 72 in the VVT mechanism 1.

Figure 20:
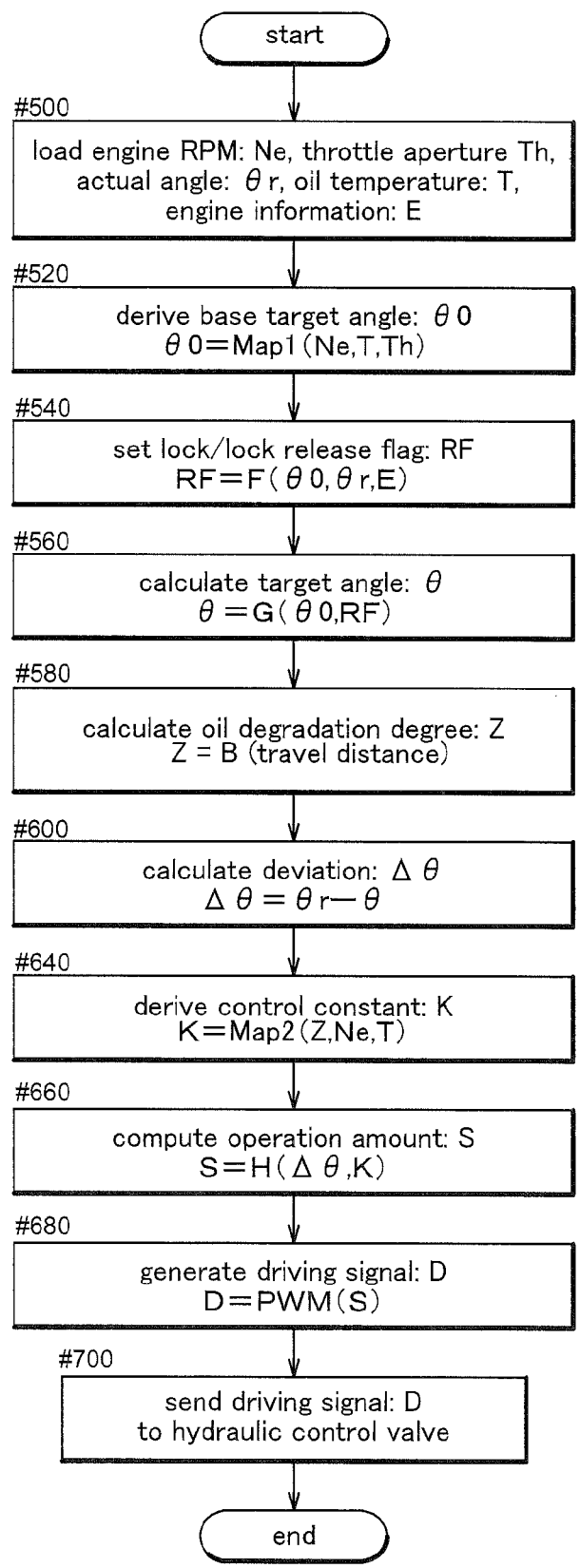
FIG. 20 is a flowchart illustrating an example of a rotational phase control routine for a VVT mechanism.

A rotational phase control routine for the VVT mechanism 1 embodying the valve timing adjustment system according to the present invention configured as described thus far will be described using the flowchart in FIG. 20.

First, the engine RPM: Ne, a throttle aperture: Th, the actual angle: θr, the oil temperature: T, and engine information: E are loaded as input parameters for the control system (#500). The engine information: E includes data indicating various driving states, such as engine startup, engine shutdown, no idling, and so on. The base target angle: θ0, serving as the rotational phase of the VVT mechanism 1 that in turn serves as the required valve timing, is derived from the loaded input parameters (#520). A pre-set map: Map(Ne, T, Th) is used to derive the base target angle: θ0.

$$\theta 0 = Map(Ne, T, Th)$$

The base target angle: θ0 may be derived by the engine ECU 11 and transferred to the control unit 90, or may be derived by the control unit 90.

Setting of a lock/lock release flag: RF expressing a locking operation or a lock release operation of the lock member 6 in the locking mechanism unit 60 is determined based on the base target angle: θ0, the actual angle: θr, and the engine information: E, using a determination function: F (#540).

$$RF = F(\theta 0, \theta r, E)$$

Next, the target correction unit 95 calculates the target angle: θ using a target angle derivation function or a map: G (#560).

$$\theta = G(\theta 0, RF)$$

At the same time, the oil degradation degree evaluation unit 97 calculates the degree of degradation of the working oil based on the travel distance (#580).

$$Z = B(\text{travel distance})$$

Next, the deviation calculation unit 961 calculates a difference between the target angle: θ and a actual angle: θr as a deviation: Δθ (#600).

$$\Delta \theta = \theta r - \theta$$

Furthermore, the control constant calculation unit 963 derives a control constant (here, the time constant): K using a map: Map2 that takes the degree of degradation: Z supplied from the oil degradation degree evaluation unit 97, as well as the engine RPM: Ne, the oil temperature: T, and so on that are additionally used as necessary, as input parameters (#640).

$$K = Map2(Z, Ne, T)$$

An operation amount: S is then computed through the operation amount calculation unit 962 that has been re-set according to the newly-derived control constant: K (#660).

$$S = H(\Delta \theta, K)$$

A driving signal: D, which is a PWM signal, is generated by the drive control unit 964 using the computed and outputted operation amount: S (#680).

$$D = PWM(S)$$

The generated driving signal: D is sent to the hydraulic control valve 72, based on which the displacement mechanism unit and the locking mechanism unit 60 of the VVT mechanism 1 are controlled.

A process for specifying the rotational phase displacement is realized by repeating this rotational phase control routine, and an example of this process (from startup to lock release) will be described using the schematic diagram in FIG. 21. Although not shown, the starting point of this process corresponds to a driving stopped state, where the restriction member 5 and the lock member 6 are inserted into the restriction recess 52 and the locking recess 62, respectively.

Step (1)

Although not shown, at startup, oil pressure is first applied to the advance chamber 41, after which the working oil is supplied to the retard chamber 42 for retard control. At this time, the working oil supplied to the retard chamber 42 advances into the locking recess 62 and pushes the lock member 6 upward.

Step (2)

When the lock member 6 is lifted from the locking recess 62, the rotational phase displaces in the retard direction D2 under the oil pressure on the retard chamber 42.

Step (3)

When the rotational phase displaces to a predetermined phase, the supply of the working oil to the retard chamber 42 is stopped, and the working oil is then supplied to the advance chamber 41 for advance control. The working oil supplied to the advance chamber 41 is used to lift the restriction member 5 from the restriction recess 52 and to hold the lock member 6 up (that is, release the lock).

Step (4)

When the restriction member 5 is lifted from the restriction recess 52, the rotational phase displaces in the advance direction D1 under the oil pressure on the advance chamber 41.

Step (5)

Furthermore, because the lock member 6 is held up (that is, the lock is released), the displacement of the rotational phase in the advance direction D1 passes beyond the locked position. As a result, the displacement continues to an advance position suited for acceleration.

Other Embodiments (1) Although the aforementioned embodiments illustrate the configuration as blocks having individual functions in order to facilitate understanding of the control units 9 and 90, the functional blocks are for illustrative purposes, and the present invention is not limited to functional blocks divided in this manner. For example, the time constant may be calculated outside of the feedback control unit 96. Furthermore, the control units 9 and 90 themselves may be constructed within the engine ECU 11. Conversely, the functions of the control units 9 and 90 may be split with a second control unit.

(2) The various functions, maps, and so on introduced into the control units 9 and 90 use phrases employed for the sake of simplicity, and include a variety of forms, such as processors, tables, neural networks, databases, and so on that perform output based on input parameters.

(3) Although the time constant for determining the temporal responsiveness is calculated each time in the above embodiments, it is also possible to employ a configuration in which a retard temporal responsiveness set during retard control for displacing the rotational phase in the retard direction D2 and an advance temporal responsiveness set during advance control for displacing the rotational phase in the advance direction D1 are prepared in advance in a selectable manner, and are selected in response to the direction of the rotation displacement being determined. Here, it is assumed that the retard temporal responsiveness is set to prioritize the certainty of the locking operation, and the advance temporal responsiveness is set to prioritize the smoothness of the rotational phase displacement.

(4) In addition to changing the time constant of the control system in order to change the temporal responsiveness, it is also possible to introduce a delay circuit into the control system, a filter for blunting the operation amount, and so on.

(5) The phrase "oil pressure" used herein refers to a fluid pressure, and the "working oil" referred to here can be replaced with a variety of fluids that transmit pressure while remaining within the scope of the present invention.

INDUSTRIAL APPLICABILITY

The present invention can be used in a valve timing adjustment system including a displacement mechanism unit that displaces the rotational phase of a camshaft relative to a crankshaft of an internal combustion engine, a locking mechanism unit that locks the rotational phase at an intermediate locked phase positioned within a displacement range of the rotational phase, a hydraulic pathway having a hydraulic control valve that hydraulically drives the displacement mechanism unit and the locking mechanism unit, and a control unit having a control system that controls operations of the hydraulic control valve.

REFERENCE SIGNS LIST

1 VVT mechanism
18 crankshaft
19 camshaft
31 partition portion (displacement mechanism unit)
32 vane (displacement mechanism unit)
41 advance chamber
42 retard chamber
5 restriction member
52 restriction recess
60 locking mechanism unit
6 lock member
62 locking recess
7 hydraulic pathway
71 hydraulic pump
72 hydraulic control valve
9, 90 control unit
92 control property determination unit
921 mode determination unit
922 property obtainment unit
95 target correction unit
96 feedback control unit
961 deviation calculation unit
962 operation amount calculation unit
963 control constant calculation unit
964 drive control unit
97 oil degradation degree evaluation unit
E engine (internal combustion engine)

The invention claimed is:

1. A valve timing adjustment system comprising:
a displacement mechanism unit that displaces a rotational phase of a camshaft relative to a crankshaft of an internal combustion engine;
a locking mechanism unit that locks the rotational phase at an intermediate locked phase positioned within a displacement range of the rotational phase;
a hydraulic pathway including a hydraulic control valve that hydraulically drives the displacement mechanism unit and the locking mechanism unit; and
a control unit including a control system that controls operations of the hydraulic control valve,
wherein the control unit changes a temporal responsiveness of the control system based on a displacement force that displaces the rotational phase.

2. The valve timing adjustment system according to claim 1,
wherein the control unit switches the temporal responsiveness of the control system between a retard control mode that displaces the rotational phase in a retard direction and an advance control mode that displaces the rotational phase in an advance direction.

3. The valve timing adjustment system according to claim 2,
wherein the temporal responsiveness is changed so that the temporal responsiveness in the advance control mode is faster than the temporal responsiveness in the retard control mode.

4. The valve timing adjustment system according to claim 3,
wherein a property obtainment unit that obtains property information regarding hydraulic properties of the hydraulic pathway is provided, and the temporal responsiveness of the control system is changed based on the property information.

5. The valve timing adjustment system according to claim 3,
wherein the control unit includes an oil degradation degree evaluation unit that evaluates a degree of degradation of working oil in the hydraulic pathway, and the temporal responsiveness of the control system is changed based on the degree of degradation.

6. The valve timing adjustment system according to claim 2,
wherein a property obtainment unit that obtains property information regarding hydraulic properties of the hydraulic pathway is provided, and the temporal responsiveness of the control system is changed based on the property information.

7. The valve timing adjustment system according to claim 2,
wherein the control unit includes an oil degradation degree evaluation unit that evaluates a degree of degradation of working oil in the hydraulic pathway, and the temporal responsiveness of the control system is changed based on the degree of degradation.

8. The valve timing adjustment system according to claim 2,
wherein the control system is a feedback control system that brings an actual value of the rotational phase closer to a target value of the rotational phase by feeding back the actual value of the rotational phase, and changing the temporal responsiveness is realized by changing a time constant of the feedback control system.

9. The valve timing adjustment system according to claim 3,
wherein the control system is a feedback control system that brings an actual value of the rotational phase closer to a target value of the rotational phase by feeding back the actual value of the rotational phase, and changing the temporal responsiveness is realized by changing a time constant of the feedback control system.

10. The valve timing adjustment system according to claim 1,
wherein a property obtainment unit that obtains property information regarding hydraulic properties of the hydraulic pathway is provided, and the temporal responsiveness of the control system is changed based on the property information.

11. The valve timing adjustment system according to claim 10,
wherein the property information includes at least one of an oil temperature, an oil pressure, an RPM of a hydraulic pump, and a degree of oil degradation in the hydraulic pathway.

12. The valve timing adjustment system according to claim 11,
   wherein the control unit includes an oil degradation degree evaluation unit that evaluates a degree of degradation of working oil in the hydraulic pathway, and the temporal responsiveness of the control system is changed based on the degree of degradation.

13. The valve timing adjustment system according to claim 11,
   wherein the control system is a feedback control system that brings an actual value of the rotational phase closer to a target value of the rotational phase by feeding back the actual value of the rotational phase, and changing the temporal responsiveness is realized by changing a time constant of the feedback control system.

14. The valve timing adjustment system according to claim 10,
   wherein the control unit includes an oil degradation degree evaluation unit that evaluates a degree of degradation of working oil in the hydraulic pathway, and the temporal responsiveness of the control system is changed based on the degree of degradation.

15. The valve timing adjustment system according to claim 10,
   wherein the control system is a feedback control system that brings an actual value of the rotational phase closer to a target value of the rotational phase by feeding back the actual value of the rotational phase, and changing the temporal responsiveness is realized by changing a time constant of the feedback control system.

16. The valve timing adjustment system according to claim 1,
   wherein the control unit includes an oil degradation degree evaluation unit that evaluates a degree of degradation of working oil in the hydraulic pathway, and the temporal responsiveness of the control system is changed based on the degree of degradation.

17. The valve timing adjustment system according to claim 16,
   wherein the control system is a feedback control system that brings an actual value of the rotational phase closer to a target value of the rotational phase by feeding back the actual value of the rotational phase; and
   the control unit is provided with a map for deriving a control constant that determines the temporal responsiveness of the control system that outputs a driving signal to the hydraulic control valve using at least the degree of degradation as an input parameter.

18. The valve timing adjustment system according to claim 16,
   wherein the oil degradation degree evaluation unit calculates the degree of degradation based on a travel distance of a vehicle driven by the internal combustion engine.

19. The valve timing adjustment system according to claim 16,
   wherein the oil degradation degree evaluation unit calculates the degree of degradation based on an amount of time that has passed since an oil change in a vehicle driven by the internal combustion engine.

20. The valve timing adjustment system according to claim 1,
   wherein the control system is a feedback control system that brings an actual value of the rotational phase closer to a target value of the rotational phase by feeding back the actual value of the rotational phase, and changing the temporal responsiveness is realized by changing a time constant of the feedback control system.

* * * * *